(12) United States Patent
Jahns et al.

(10) Patent No.: US 11,858,350 B2
(45) Date of Patent: Jan. 2, 2024

(54) FLEXIBLE NOTIFICATIONS VIA AN INSTRUMENT CLUSTER

(71) Applicant: PACCAR Inc, Bellevue, WA (US)

(72) Inventors: Steven Karl Jahns, Bellingham, WA (US); Ryan Anthony Reed, Kenmore, WA (US); Jonathan Scott Duncan, Seattle, WA (US); Jon Forrest Acton, Ft. Worth, TX (US); Jacob Michael White, Flower Mound, TX (US); Raeef Hesham Wahib Barsoum, Bellingham, WA (US); Brett Grant Kellerstedt, McKinney, TX (US); Ian Ramsay Hunt, Denton, TX (US); Hervé Jen Raymond Cecchi, Santa Clara, CA (US); Anna-Magdalena Schatz, Bensheim (DE); Christina Nenke, Muehlheim (DE); Marc George Wilczak, Lake Balboa, CA (US); Nicole Johnson, West Los Angeles, CA (US)

(73) Assignee: PACCAR Inc., Bellevue, WA (US)

(*) Notice: Subject to any disclaimer, the term of this patent is extended or adjusted under 35 U.S.C. 154(b) by 273 days.

(21) Appl. No.: 17/067,371

(22) Filed: Oct. 9, 2020

(65) Prior Publication Data
US 2021/0237576 A1 Aug. 5, 2021

Related U.S. Application Data

(60) Provisional application No. 62/978,691, filed on Feb. 19, 2020, provisional application No. 62/978,698, (Continued)

(51) Int. Cl.
*B60K 37/02* (2006.01)
*B60K 35/00* (2006.01)
(Continued)

(52) U.S. Cl.
CPC .............. *B60K 37/02* (2013.01); *B60K 35/00* (2013.01); *B60K 2370/111* (2019.05);
(Continued)

(58) Field of Classification Search
CPC .. B60K 37/02; B60K 35/00; B60K 2370/152; B60K 2370/155; B60K 2370/171;
(Continued)

(56) References Cited

U.S. PATENT DOCUMENTS

| 2011/0175754 A1* | 7/2011 | Karpinsky | ............. B60K 35/00 340/963 |
| 2011/0208384 A1* | 8/2011 | Tarte | ...................... B60K 35/00 701/31.4 |

(Continued)

*Primary Examiner* — Douglas M Wilson
(74) *Attorney, Agent, or Firm* — Merchant & Gould P.C.

(57) ABSTRACT

Systems, methods and computer readable storage media provide flexible vehicle status notifications via an instrument cluster displayed on an in-vehicle screen. In some examples, when a non-displayed gauge goes into an out-of-parameter or warning range, the gauge may be dynamically shown in the out-of-parameter or warning state in a container position assigned to the gauge in another display or in a dynamic container position in the instrument cluster. In some examples, a popup notification may be provided to inform the driver of a condition. When there are multiple notifications, they may be grouped into definable severity classifications and prioritized so that a notification determined to be a most important message at the time is presented to the driver in a notification zone central to a driver's field of vision on the instrument cluster that allows for reusing screen space for providing warning and information from a range of data sources.

18 Claims, 17 Drawing Sheets

Related U.S. Application Data filed on Feb. 19, 2020, provisional application No. 62/970,490, filed on Feb. 5, 2020.

(51) Int. Cl.
 *B60R 16/023* (2006.01)
 *B60W 50/14* (2020.01)

(52) U.S. Cl.
 CPC .. *B60K 2370/152* (2019.05); *B60K 2370/155* (2019.05); *B60K 2370/171* (2019.05); *B60K 2370/178* (2019.05); *B60K 2370/186* (2019.05); *B60K 2370/188* (2019.05); *B60K 2370/191* (2019.05); *B60K 2370/193* (2019.05); *B60K 2370/195* (2019.05); *B60K 2370/52* (2019.05); *B60R 16/0232* (2013.01); *B60W 50/14* (2013.01); *B60Y 2200/14* (2013.01); *B60Y 2200/141* (2013.01); *B60Y 2200/1422* (2013.01)

(58) Field of Classification Search
 CPC .......... B60K 2370/178; B60K 2370/52; B60K 2370/111; B60K 2370/115; B60K 2370/122; B60K 2370/186; B60K 2370/188; B60K 2370/191; B60K 2370/193; B60K 2370/195; B60R 16/0232; B60W 50/14
 See application file for complete search history.

(56) References Cited

U.S. PATENT DOCUMENTS

| | | |
|---|---|---|
| 2017/0136877 A1* | 5/2017 | Boss ................... G06F 3/013 |
| 2021/0237572 A1 | 8/2021 | Jahns |
| 2021/0237573 A1 | 8/2021 | Jahns |
| 2021/0237574 A1 | 8/2021 | Jahns |
| 2021/0239204 A1 | 8/2021 | Jahns |

* cited by examiner

| | Red | Amber | White | Flashing | Audible Alert | Haptic Alert | Safety Rating | | Oper Rating | | Time Rating |
|---|---|---|---|---|---|---|---|---|---|---|---|
| Level 1 | x | | | A | A | x | 1 | AND | 1 | AND | A,B,C |
| Level 2 | x | x | | A | A | | 1 | EXOR | 1 | AND | A,B,C |
| Level 3 | x | | | | | | 1 | AND | 1 | AND | E |
| Level 4 | | x | | B | | | 1 | EXOR | 1 | AND | D |
| Level 5 | | x | | C | x | | 2 | AND | 2 | AND | A,B,C,D |
| Level 6 | | x | | | | | 2 | AND | 2 | AND | E |
| | | x | | | | | 2 | EXOR | 2 | AND | A,B,C,D |
| | | x | | | | | 1 | EXOR | 2 | AND | E |
| | | x | | | | | 1 | EXOR | 1 | AND | E |
| Level 7 | | | x | | | | 3 | AND | 3 | AND | ANY |

FIG. 6

| Top MS Message 712a | Top IQ Message 704a | | | | | |
|---|---|---|---|---|---|---|
| | Critical Lower POI# | Critical Equal or Higher POI# | Non-Critical Temporary Lower POI# | Non-Critical Temporary Equal or Higher POI# | Non-Critical Non-Temporary Lower POI# | Non-Critical Non-Temporary Equal or Higher POI# |
| Critical | Interrupt & Show | Hold* | Hold | Hold | Hold | Hold |
| Non-Critical Non-Temporary | Interrupt & Show^ | Interrupt & Show^ | Interrupt & Show^ | Interrupt & Show^ | Interrupt & Show^ | Hold^* |
| Non-Critical Temporary | Interrupt & Show^ | Interrupt & Show^ | Interrupt & Show^ | Hold | Hold | Hold |

FLEXIBLE NOTIFICATIONS VIA AN INSTRUMENT CLUSTER

CROSS-REFERENCE TO RELATED APPLICATIONS

This application claims the benefit of U.S. Provisional Application No. 62/970,490, having the title of "FLEXIBLE NOTIFICATION SYSTEM" and the filing date of Feb. 5, 2020, U.S. Provisional Application No. 62/978,691, having the title of "INSTRUMENT CLUSTER USER INTERFACE" and the filing date of Feb. 19, 2020, and U.S. Provisional Application No. 62/978,698, having the title of "INSTRUMENT CLUSTER USER INTERFACE" and the filing date of Feb. 19, 2020, which are incorporated herein by reference in their entireties.

BACKGROUND

Instrument clusters for vehicles typically have been mechanical analog gauges having a dial and a rotating needle that points to indicia printed on the dial to provide a driver with a visual indication of a measurement associated with a current status of the vehicle. For example, the vehicle may be configured with physical gauges to inform the driver of information useful for operation of the vehicle. As can be appreciated, such a configuration of physical gauges may occupy valuable real estate space in the vehicle and can be distracting to the driver.

In some cases, a digital display may be used for an instrument cluster, wherein the screen layout may include various gauges located on the display. When a vehicle is showing a maximized set of information, there may not be additional room for more gauges; however other gauge information may exist on the vehicle in the background. Further, in some cases, popup notifications may be used to warn or provide information messages to the driver, but popup notifications may be too numerous to be effective and may lack necessary context to inform the driver of salient information.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing flexible vehicle status notifications via an instrument cluster displayed on an in-vehicle screen. In some examples, the instrument cluster may be implemented in a medium or heavy duty truck.

In some examples, dynamic containers may be provided. When a hidden gauge going into an out-of-parameter or warning state, the hidden gauge may be brought onto the screen and shown in a dynamic container. Other gauges may be compacted to provide room for the dynamic container. Decisions associated with whether, where, and how to display the gauge in the dynamic container may be based on gauge priority logic.

In some examples, an out-of-parameter gauge state and associated out-of-parameter display state may be provided for when a measurement is outside of the normal operating threshold (e.g., above or below), but not within a warning threshold. According to an aspect, a gauge in the out-of-parameter state may be displayed as such to inform the driver to take note of the gauge, not to alarm the driver where he/she may think there may be a significant problem. In some examples, gauges may have an out-of-parameter display state where they are brought onto the screen (if hidden) or highlighted (if currently displayed on-screen) via an animation and/or color change to draw the driver's attention to the out-of-parameter gauges.

In some examples, popup notifications may be displayed to inform the driver of a condition. Given the sheer number of possible messages and variety of severities of the warnings, classification, prioritization and presentation format of popup notifications may be determined as part of selecting whether, when, and how to display a popup notification. In some examples, popup messages and other messaging may be provided in a reconfigurable zone that is located in a central zone of the instrument cluster.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIG. 6 is an illustration of an example decision matrix that may be used to determine a salience level for a message;

FIG. 8 is an illustration of an example arbitration matrix that may be used to arbitrate between multiple messages for selecting a top message to display as a popup notification;

DETAILED DESCRIPTION

Figure 1A:
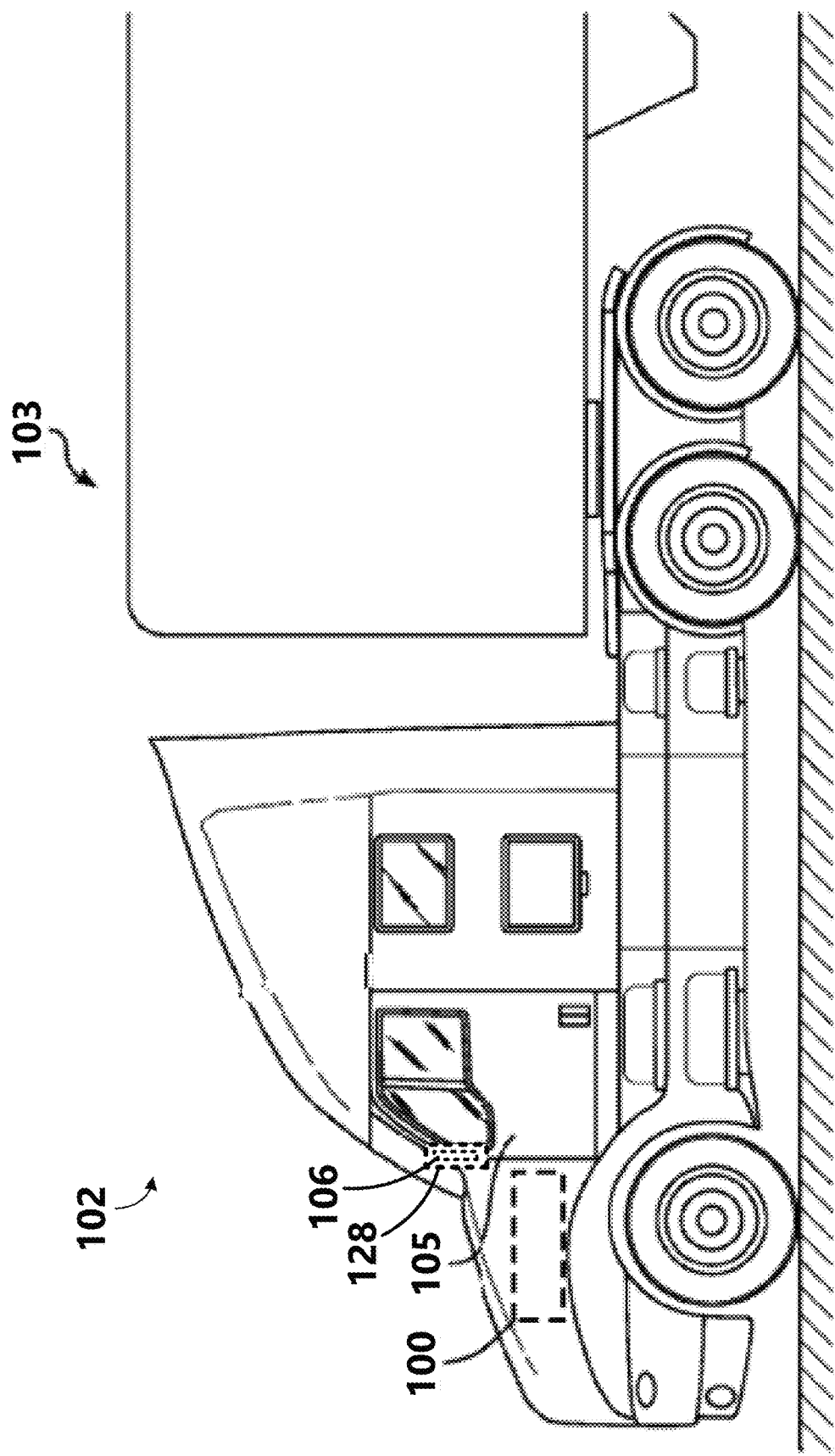
FIG. 1A is an illustration depicting a side view of a vehicle.

Aspects of the present disclosure are generally directed to systems, methods and computer readable storage media for providing a flexible and variability-accommodating instrument cluster for display on an in-vehicle screen. The disclosure generally relates to systems, methods, and computer readable storage media for providing flexible vehicle status notifications via an instrument cluster displayed on an in-vehicle screen.

The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

As discussed, physical gauges may occupy valuable real estate space in the vehicle and can be distracting or unnecessary. For example, a number of gauges may show information that are in a "normal" or non-needed state. The display of such information may not provide a benefit to the driver, and may instead overload the driver with available information. As such, the driver may be less aware and/or responsive to abnormal conditions that may necessitate the driver's attention. Additionally, physical gauges and the arrangement of gauges may vary amongst various vehicle build configurations. For example, custom-built vehicles may have various instrumentation configurations corresponding to variations in vehicle build configurations, wherein a vehicle may be ordered with a variety of gauges and vary across fleet orders or applications in which the vehicle may be used. In some examples, this may also unfavorably require a manufacturer of the vehicle to dedicate resources (e.g., inventory, storage for inventory, assembly resources associated with more complex assembly) to building vehicles with high part variation.

In some cases, a digital display may be used for an instrument cluster, wherein the screen layout may include various gauges may be located on the display via defined size containers. For example, a gauge within that container may include a dynamic progress bar, a scale range bar, tick marks, scale numbers, a gauge function icon, and text label. When a vehicle is showing a maximized set of containers, there may not be additional room for more gauges; however other gauge information may exist on the vehicle in the background.

Additionally, there may be times when a driver may need to monitor a gauge (displayed or in the background) if it starts to go outside of its normal operating range but prior to being in a true warning state. The driver may not be aware that a gauge is approaching a warning state, which may not provide the driver with ample reaction time to avoid possible damage to the vehicle. For example, if an on-screen gauge starts to go beyond a calculated normal level, the driver may not notice the gauge amongst the other gauges; or, if the gauge is off-screen, the driver may not be alerted until the gauge is already in a warning state.

In some cases, popup notifications may be used to warn or provide information messages to the driver. In some examples, a driver may not be aware of which system may be associated with a popup notification or what to do when a fault condition occurs. Conveying appropriate salience with respect to criticality of a message may include the use of colors (e.g., white, amber, red); however, additional salience classifications may help to aid the driver's understanding of the severity level of a displayed popup notification. Priority Order Index (POI) definitions may help to rank in-vehicle messages to be ranked in terms of importance; however such definitions may not be sufficient for correlating the importance with an appropriate salience level or for handling conflicts arising from multiple, equally critical triggering at the same time. Given the sheer number of possible messages, and the variety of severities of warnings that can be included in a notification, a priority scheme may be needed to reduce information overload and improve the user experience.

FIG. 1A depicts a side view of a vehicle 102. The vehicle 102 may be a part of a tractor-trailer combination, which may include the vehicle 102 having a so-called fifth wheel by which a box-like, flat-bed, or tanker semi-trailer 103 (among other examples) may be attached for transporting cargo or the like. While the vehicle 102 is depicted as a truck in FIG. 1A, it should be appreciated that the present technology is applicable to any type of vehicle where a flexible and variability-accommodating instrument cluster display is desired.

The example vehicle 102 includes a cabin 105 from which a driver may operate the vehicle 102. The cabin 105 includes a display screen 128 on which a flexible and variability-accommodating instrument cluster 106 may be displayed. According to one aspect, the instrument cluster 106 is configured to provide vehicle status-related information to the driver of the vehicle 102. Notifications included in the displayed instrument cluster 106 and display attributes of the notifications may be determined by a notification system 100 of the vehicle 102. Components and operations of an example notification system 100 is discussed in further detail below.

Figure 1B:
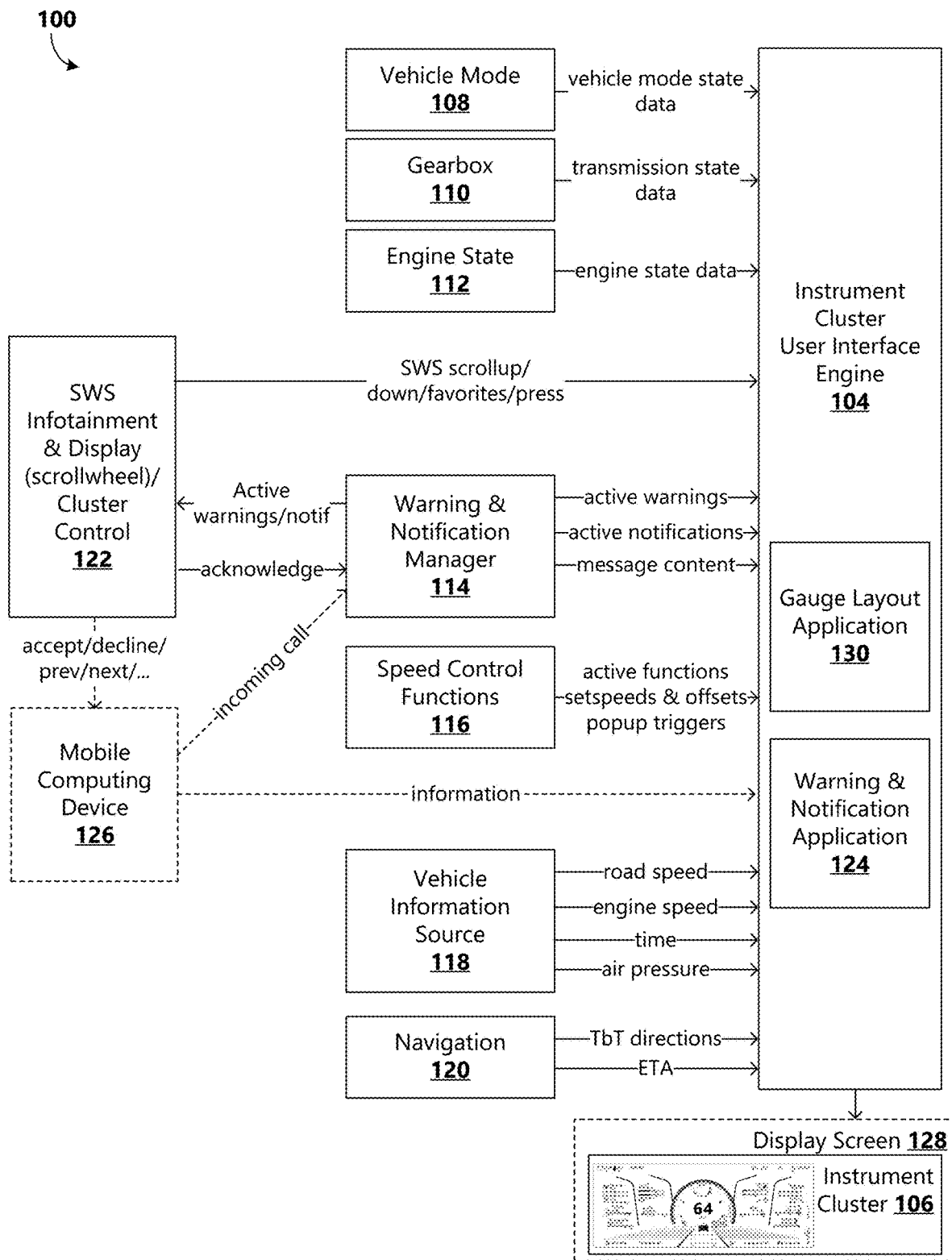
FIG. 1B is a block diagram of an example notification system according to an embodiment.

With reference to FIG. 1B, a schematic block diagram is provided of an example notification system 100 in which aspects of the present disclosure can be implemented. For example, some or all of the elements of the system 100 may be embodied in the vehicle 102. The example notification system 100 includes various data sources in communication with an instrument cluster user interface (UI) engine 104. According to an aspect, the instrument cluster UI engine 104 is illustrative of a software module, system, or device that is operative or configured to receive various signal inputs from a plurality of data sources and provide the flexible and variability-accommodating instrument cluster 106 for display on the display screen 128 included in the vehicle 102. According to one aspect, the instrument cluster 106 is configured to provide vehicle status-related information to the driver of the vehicle 102. According to an aspect, the instrument cluster UI engine 104 may include or be communicatively connected to a gauge layout application 130 comprising logic rules and layout rules that may be used by the instrument cluster UI engine 104 to select inclusion, form, and placement of content in the instrument cluster 106.

In some examples, vehicle status-related information may presented in the form of gauges that provide a visual display of measurements associated with the vehicle 102. Because at least a portion of the instrument cluster 106 can be display-based, gauges can be utilized to communicate various attributes of vehicle status-related information and driver notifications, which was not previously possible with only physical needles and dials with lights. As will be described in further detail below, a gauge may be classified into one of various states or modes, where in each state may have a different display state comprising different presentation attributes that may convey different criticality levels. Example gauge states include an on-screen within-parameter state, a hidden within-parameter state, an out-of-parameter state, a warning state, and a magnitude only state.

According to an aspect, the instrument cluster UI engine 104 may include or be communicatively connected to a warning and notification application 124 comprising logic rules and display rules that may be used by the instrument cluster UI engine 104 to select inclusion, type, and properties of warnings and notifications in the instrument cluster 106. In some examples, vehicle status-related information may be presented in the form of a warning or message when a measurement is out-of-parameter or in a warning state, and the warning/notification may be in the form of a popup notification. A popup notification may be selected for display, and display attributes of the popup notification may be based on a combination of safety relevance, operational relevance, and timeframe. As will be described in further detail below, a popup notification may be displayed in the instrument cluster 106 in a defined space and according to a format template (e.g., icon, color, and text) that may convey a system in an out-of-parameter or warning state needing the driver's attention, and may include command level language informing the driver of an action to perform based on the associated out-of-parameter/warning state measurement.

The plurality of data sources may include any suitable data source, unit, or sensor operative to provide various data or signaling information that may be used by the instrument cluster UI engine 104 to provide vehicle status-related information via the instrument cluster 106. The plurality of data sources can include, but are not limited to, a vehicle mode data source 108, a gearbox data source 110, an engine state data source 112, a warning and notification manager 114, a speed control function data source 116, a vehicle information data source 118, a navigation data source 120, and steering wheel switch (SWS) infotainment and display actuation data sources 122, 124 (e.g., via a scroll wheel, dial, or other actuator (referred to herein as a cluster control 122)). In some examples, another data source may include a mobile computing device 126 in communication with the instrument cluster UI engine 104. One or more of the data sources 108, 110, 112, 114, 116, 118, 120, and 122 can comprise an engine control unit, a vehicle control unit, or other systems of the vehicle 102. As can be appreciated, in other examples, additional or alternative data sources are possible and are within the scope of the present disclosure.

In an example aspect: the vehicle mode data source 108 is operative to provide vehicle mode state data; the gearbox data source 110 is operative to provide transmission state data; the engine state data source 112 is operative to provide engine state data; the warning and notification manager 114 is operative to provide information associated with active warnings, active notifications, and message content; the speed control function data source 116 is operative to provide information associated with active functions, set-speed values, offset values, and popup triggers; the vehicle information data source 118 is operative to provide information associated with the vehicle's road speed, engine speed, and air pressure, and time; the navigation data source 120 is operative to provide turn-by-turn direction information and estimated arrival time (ETA) information in association with a navigable route; the cluster control 122 is operative to enable the driver to navigate between views, menus, and list items; suppress suppressible popup notifications, etc.

In some examples, the cluster control 122 includes a scroll wheel. In other examples, the cluster control 122 includes a rotatable dial control. According to an aspect, the cluster control 122 is located on a steering wheel, and an ability to easily transition between content views, including an ability to change the number of gauges displayed in the instrument cluster 106, may be provided by a simple thumb-scroll or rotation of the cluster control 122. For example, the instrument cluster 106 may be utilized for providing a selectable amount of (within-parameter) information to a driver of the vehicle 102, wherein the driver may be provided with an ability to control the visual workload. Rather than simply replacing one digital gauge for another, scrolling to another content view may expand a display of gauges from a minimal view to a maximum number (e.g., minimized content view to basic content view to enhanced content view). In some examples, the display screen 128 may include a touch interface via which the driver may be enabled to interact with the instrument cluster 106.

Figure 2A:
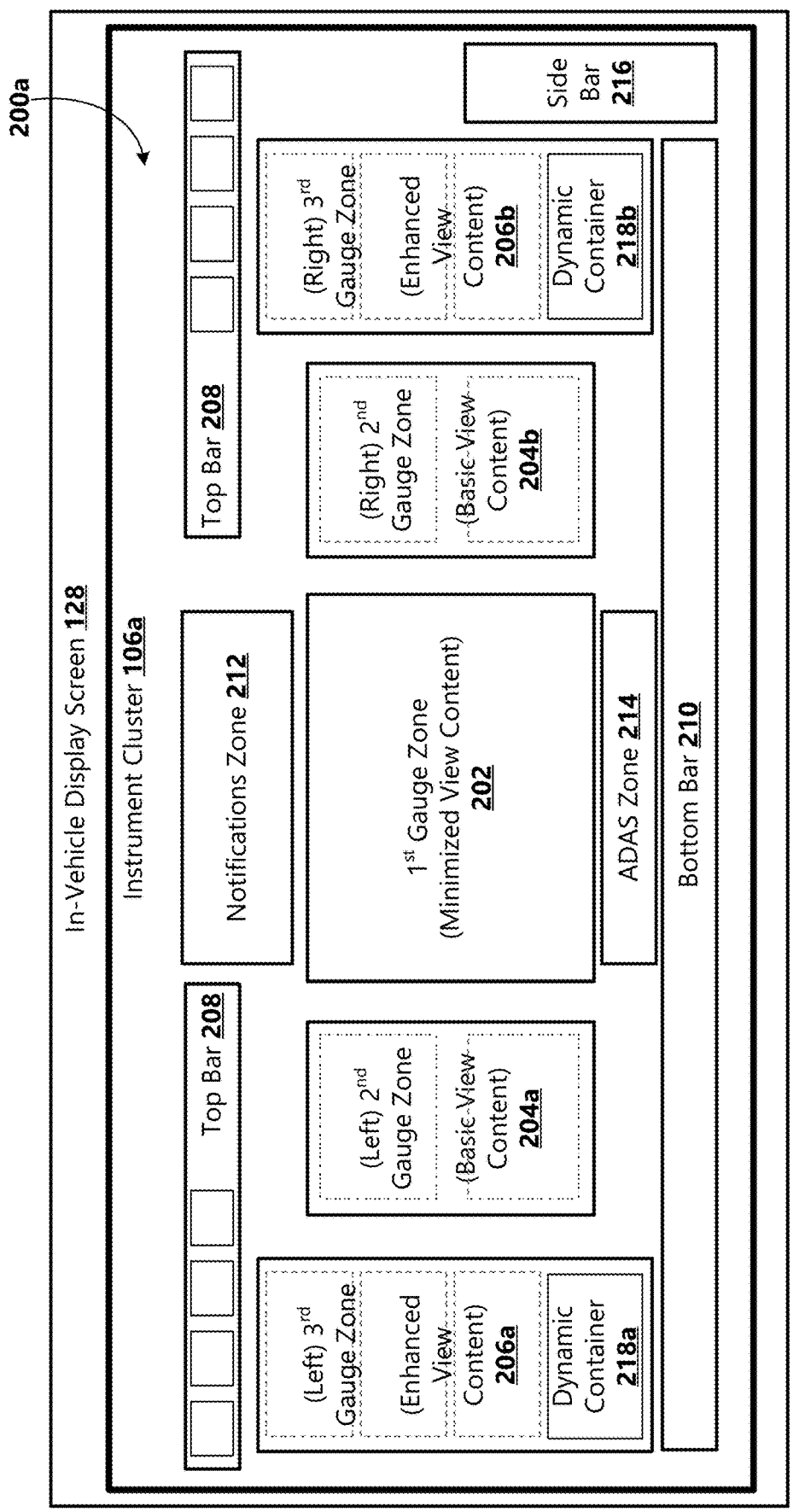
FIG. 2A is a schematic diagram of an example instrument cluster according to an embodiment.

With reference now to FIG. 2A, an example layout 200a of an instrument cluster 106a displayed on an in-vehicle display screen 128 is shown according to a first embodiment. For example, the layout 200a of the instrument cluster 106a may comprise a plurality of content display zones 202-216 that may be displayed or hidden based on a user-selected content view. According to an example aspect, the layout 200a of the instrument cluster 106a may include a first gauge zone 202 that may be shown in a minimized content view, in a basic content view, and in an enhanced content view, second gauge zones 204a,b (generally 204) that may be hidden in the minimized content view but shown in the basic content view and in the enhanced content view, and a third gauge zone 206a,b (generally 206) that may be hidden in the minimized content view and in the basic content view but shown in the enhanced content view. In some examples, a favorites function may be provided that allows for a driver-selectable set of gauges to be configured as a personalized favorites screen/view. For example, in a favorites setup process, the driver may choose one or more gauges to include in the second gauge zones 204 and/or the third content zones 206. In some examples, a plurality of favorites views and other settings may be stored in association with a plurality of drivers.

According to an aspect, the second gauge zones 204 and the third gauge zones 206 may each comprise one or more containers (as indicated by the dotted outlines) configured to hold single, super, and/or combo gauges based on a set of layout rules. For example, the set of layout rules may dictate which types of gauges can be displayed in a particular container, which gauges may be combined into a super gauge and share a same scale, which gauges may be related and can be brought together in a combination (combo) gauge that may or may not share a same scale, whether a gauge is displayed in a compact version or a normal/long version, etc. For example, a gauge may be shown in different formats to conserve display area by either combining gauge functions or by compressing the gauge information to make room for additional gauges to be displayed.

In some examples, vehicle status-related information that may be included in the first gauge zone 202 may include a minimal set of gauges including at least a display of information associated with the vehicle's road speed (i.e., a speedometer) and the vehicle's engine speed (i.e., a tachometer).

In some examples, vehicle status-related information that may be included in the second gauge zones 204 includes a display of basic view gauges, such as: one or more air pressure gauges, one or more oil pressure gauges, one or more fuel level gauges (which may optionally include a diesel exhaust fluid (DEF) level gauge), and one or more water temperature gauges, while suppressing a display of additional gauges that may be within normal usage ranges (e.g., as opposed to out-of-parameter or warning ranges).

In some examples, vehicle status-related information that may be included in the third gauge zones 206 may be specific to the vehicle build configuration and priority of available gauges. In some examples, the instrument cluster UI engine 104 may include or be communicatively connected to the gauge layout application 130 comprising logic rules (e.g., a priority level, warning state, included in a super or combo gauge) and layout rules that may be used by the instrument cluster UI engine 104 to select inclusion and placement of available gauges in the maximized enhanced content view. Examples of available gauges that may be included in the third gauge zone include: brake application gauge(s) (e.g., truck and trailer brake application), an engine oil temperature gauge, air suspension gauge(s), a torque gauge(s), a boost gauge, a transmission oil temperature gauge, an air filter gauge, a steering axle temperature gauge, a front-rear axle temperature gauge, a center-rear axle temperature gauge, a rear-rear axle temperature gauge, a fuel filter restriction gauge, an auxiliary transmission temperature gauge, a transfer case oil temperature gauge, an electric current/ammeter gauge, and a trailer reservoir pressure gauge. In some examples, in the favorites view, the driver may be enabled to select which available gauges to include in gauge containers in the second gauge zones 204 and the third gauge zones 206 based on the layout rules.

Other elements that may be included in the layout 200a of the instrument cluster 106a and that may be persistently displayed when the vehicle 102 is in a drive mode may include a top bar 208, a bottom bar 210, a side bar 216, and a notifications zone 212. In some examples, the top bar 208 may include a display of one or more of the following information elements: a voltmeter, a clock, an active warning indicator (e.g., indicating a number of active critical red warnings and amber warnings), an outside temperature indicator, and a diesel particulate filter (DPF) status indicator. In some examples, the bottom bar 210 may include a display of one or more of the following information elements: an odometer, a trip odometer, a sub-trip odometer, and engine power take-off (PTO) hours indicator (e.g., if the vehicle 102 is equipped with a PTO system). In some examples, the side bar 216 may include a display of a pagination indication of the drive view (e.g., an indication of an active content view page in relation to a set of content view pages) and a drive mode indication (e.g., an indication of a control position of the active gear: drive, neutral, reverse).

In some examples, the notifications zone 212 may include suppressible or non-suppressible popup notifications when a fault or a need to message the driver is triggered, and may further include a selectable display of information associated with information sources such as: entertainment/radio, a communicatively-connected mobile computing device 126 (e.g., mobile phone, music device), and navigation system 120. In some examples, the notifications zone 212 is persistently displayed in each content view mode. For example, the notifications zone 212 may provide a dedicated location to show a variety of warning, convenience, or other informational type messaging to the driver. Popup warning/notification messages displayed in the notifications zone 212 and other messaging may be selected based on determinations made by the warning and notification application 124 and gauge layout application 130. For example, the notification zone 212 may be a reconfigurable area that allows for reusing screen space in the vehicle 102 for providing information from a range of data sources beyond that of just warnings (e.g., turn-by-turn instructions, phone status, smartphone-enabled application, current song, artist, etc.

In some examples, the content display zones included in the layout 200a of the instrument cluster 106a may further include an advanced driver-assistance system (ADAS) zone 214. The ADAS zone 214 may be provided when the vehicle 102 is configured with an ADAS and the ADAS is active, and may include a display of passive and/or active driver assistance information, settings, and warnings. In some examples, the ADAS zone 214 is persistently displayed in each content view mode.

According to another aspect of the present disclosure, dynamic containers 218*a,b* (generally 218) may be included in the instrument cluster 106*a* for providing a way to put additional gauge information onto the instrument cluster 106*a* that may already be full of gauge information. For example, when a particular gauge goes into an out-of-parameter or a warning state that is in the background of sensors being monitored by the vehicle 102 (i.e., not currently included in the display of the instrument cluster 106*a* and may not have an assigned position in the instrument cluster), the particular gauge may be dynamically displayed in a dynamic container 218. In some examples, the dynamic containers 218 are located in the third gauge zones 206 as shown in FIG. 2A. In some examples, in order to maintain spatial locations for the gauges already on the screen, the other containers in a third gauge zone 204*a,b* may collapse into a smaller area (e.g., transitioned into a compact or smaller version) and allow for an additional gauge (e.g., out-of-parameter or warning state gauge) to appear below them in the dynamic container 218*a,b*. When the dynamic container 218 disappears, compacted gauges may transition back to their normal (longer) version. As should be appreciated, additional and/or alternative information elements may be displayed in the instrument cluster 106*a* and are within the scope of the present disclosure.

Figure 2B:
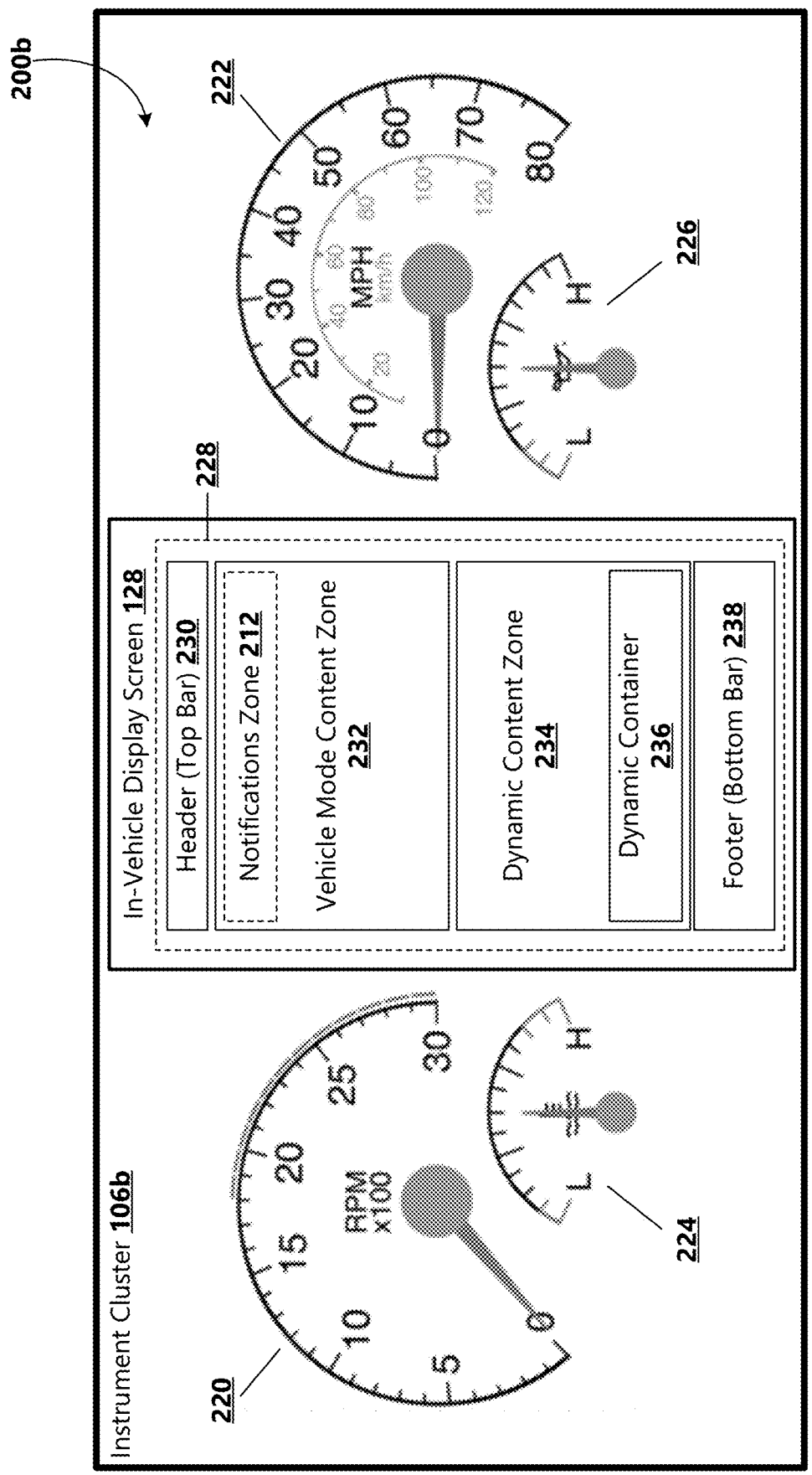
FIG. 2B is a schematic diagram of an example instrument cluster according to another embodiment.

With reference now to FIG. 2B, another example layout 200*b* of an instrument cluster 106*b* according to a second embodiment is shown. In some examples, the layout 200*b* of the instrument cluster 106*b* may comprise a combination of physical gauges and a digital display. According to one example, the physical gauges may include a tachometer 220, a speedometer 222, an engine coolant temperature gauge 224, and an oil pressure gauge 226, and the digital display may include a display of a plurality of display screens, sometimes referred to herein as cards 228. In other examples, one or more of the tachometer 220, speedometer 222, engine coolant temperature gauge 224, and oil pressure gauge 226 may be embodied as digital displays.

The cards 228 may include various display zones. In one example, a card 228 may include a header or top bar 230, a vehicle mode content zone 232, a dynamic content zone 234, and a footer or bottom bar 238. For example, the top bar 230 may include a set of persistent content horizontally across the top of the screen 128. The vehicle mode content zone 232 may include content specific to the vehicle's current mode (e.g., drive versus park) and state (e.g., active versus inactive). In some examples, the vehicle mode content zone 232 may include a digital speedometer, cruise control functions, engine brake information, an ADAS zone, and a plurality of digital telltale slots. In some examples, when a determination is made to provide a popup notification (described in further detail below), the popup notification may be displayed in a notifications zone 212 located in a top portion of the vehicle mode content zone 232. For example, the notifications zone 212 may be in a location central to the driver's field of vision on the instrument cluster 106*b*. The dynamic content zone 234 may include specific content unique to the card 228, which may include gauges, custom setup options, ADAS features, TPMS, menu options, and/or trip information. The bottom bar 238 may include vehicle-specific fuel gauge configurations.

According to an aspect, the gauge layout application 130 may comprise logic rules and layout rules that may be used by the instrument cluster UI engine 104 to select inclusion and placement of available gauges in the dynamic content zone 234. In some examples, different formats may be used to conserve display area by either combining gauge functions or compressing the gauge information to make room for additional gauges to be displayed. For example, a gauge displayed in the dynamic content zone 234 may be in a single gauge format (e.g., one gauge function displayed individually), a double gauge format (e.g., two gauge functions displayed together), or a compact gauge format (gauges that have elements removed). In some examples, the dynamic content zone 234 may include a dynamic container 236, which like the dynamic container 218 included in the instrument cluster 106*a* in the first embodiment, is a container that may be dynamically displayed when a non-displayed gauge is out-of-parameter or in warning state. In some examples, when a gauge is displayed in the dynamic container 236, the gauges displayed above the dynamic container may be transitioned into a compact version (e.g., a smaller version so that there is room for the dynamic container 236). When the dynamic container 236 disappears, compacted gauges may transition back to their normal (longer) version. Gauge states, notifications and warnings of gauge states, and dynamic containers 218,236 are described in further detail below with reference to example instrument cluster 106 UI examples shown in FIGS. 3A-D, 4A-C, and 5A-D.

Figure 3A:
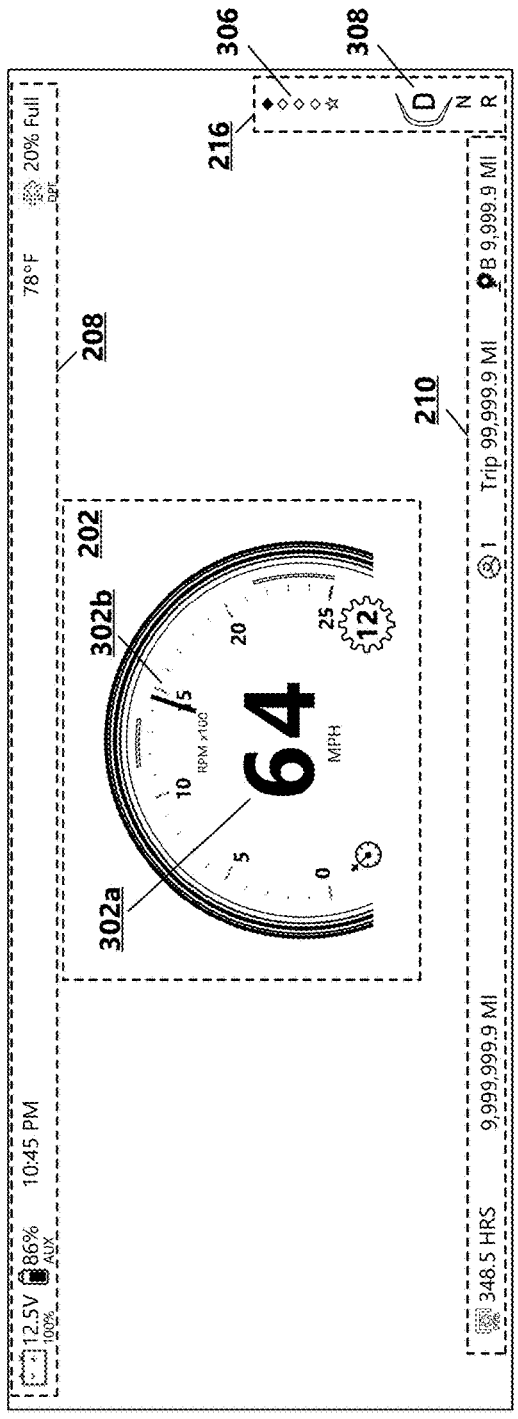
FIG. 3A is an illustration of an example instrument cluster in a minimized content view with no active out-of-parameter or warning gauges.

In the example instrument cluster 106 UIs shown in FIGS. 3B-D, 4A-C, and 5C-D, example gauges are illustrated as slider gauges. However, as should be appreciated, in other examples, the gauges may be displayed as analog gauges or other types of gauges. In some examples, the gauges may include a scale, which may or may not include tickmarks, a pointer/indicator that moves in relation to the measurement represented by the particular gauge, and an indication of a warning zone. For example, the indication of the warning zone may be denoted when available so that the needle position relative to a warning state can be understood in advance of a warning condition. With reference now to FIG. 3A, an instrument cluster 106*a* is shown in an example minimized content view, wherein the instrument cluster 106*a* may at least include a display of information associated with the vehicle's road speed and the vehicle's engine speed. For example and as illustrated, minimal view gauges 302 included for display in the minimized content view may include a speedometer 302*a* and a tachometer 302*b*. As illustrated, in the minimized content view, the top bar 208 and bottom bar 210 may additionally be displayed. In some examples (and as shown in an example maximized content view in FIG. 3C), when the vehicle 102 is configured with an ADAS and when the ADAS is active, the instrument cluster 106*a* may further include a display of ADAS-related passive and/or active driver assistance information, settings, and warnings in the ADAS zone 214.

Figure 3B:
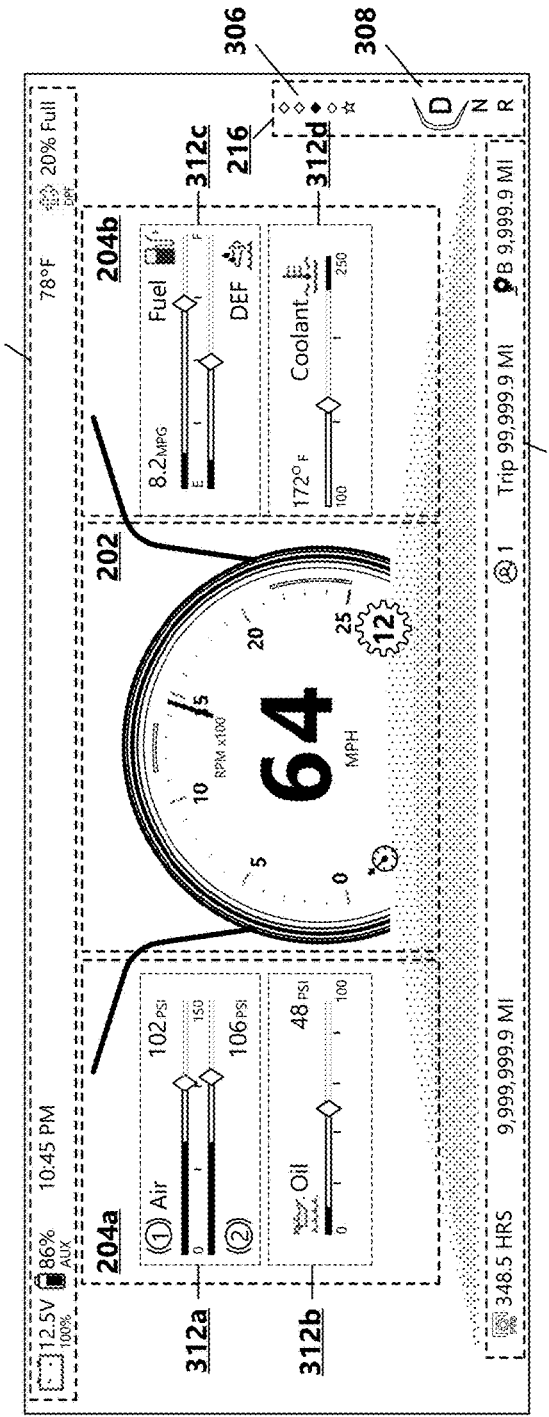
FIG. 3B is an illustration of an example instrument cluster in a basic content view with no active out-of-parameter or warning gauges.

With reference now to FIG. 3B, an instrument cluster 106*a* is shown in an example basic content view, wherein the instrument cluster 106*a* may include a display of vehicle status-related information relative to the first gauge zone 202 and the second gauge zones 204. In some examples, the basic content view may include a display of information that may be typically provided by basic view gauges included in an instrument cluster of a vehicle 102. For example, the basic content view may include a display of minimal view gauges 302 included in the minimized content view in the first gauge zone 202. Additionally, the second gauge zones 204 may include a display of basic view gauges 312, such as: one or more air pressure gauges 312*a*, one or more oil pressure gauges 312b, one or more fuel level gauges 312c (which may optionally include a diesel exhaust fluid (DEF) level gauge), and one or more water temperature gauges 312d.

Figure 3C:
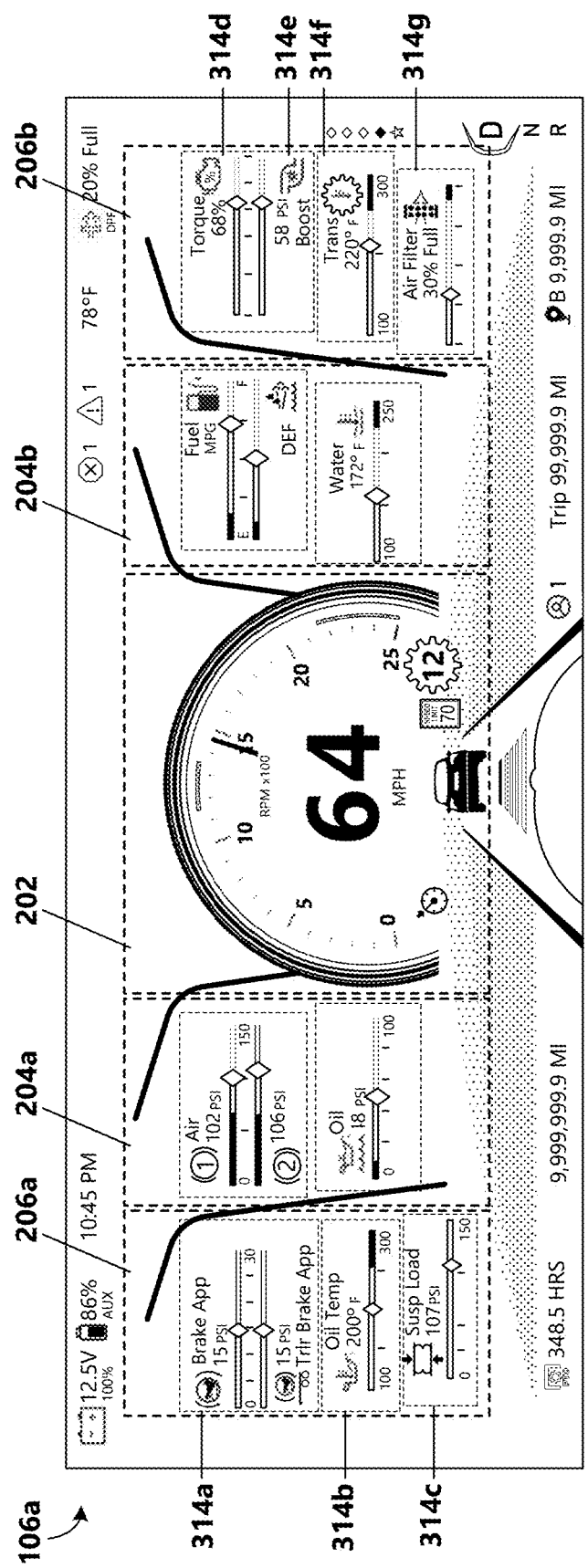
FIG. 3C is an illustration of an example instrument cluster in an enhanced content view with no active out-of-parameter or warning gauges.

With reference now to FIG. 3C, an instrument cluster 106a is shown in an example enhanced content view, wherein the instrument cluster 106a may include a display of vehicle status-related information relative to the first gauge zone 202, the second gauge zones 204, and the third gauge zones 206. In some examples, the enhanced content view may include additional vehicle status-related information (e.g., conditional and/or optional gauge content) that may be specific to the build configuration of the vehicle 102. For example, enhanced view gauges 314 included in the enhanced view may be defined by the truck order configuration and the layout may be determined by the gauge layout application 130. In some examples, the enhanced content view may include a display of minimal view gauges 302 included in the minimized content view in the first gauge zone 202, a display of basic view gauges 312 included in the basic content view in the second gauge zone 204, and additionally, in the third gauge zones 206, may include a display of one or more enhanced view gauges 314, such as but not limited to: a brake application gauge(s) 314a (e.g., truck and trailer brake application), an engine oil temperature gauge 314b, air suspension gauge(s) 314c, a torque gauge(s) 314d, a boost gauge 314e, a transmission oil temperature gauge 314f, an air filter gauge 314g, a steering axle temperature gauge (not shown), a front-rear axle temperature gauge (not shown), a center-rear axle temperature gauge (not shown), a rear-rear axle temperature gauge (not shown), a fuel filter restriction gauge (not shown), an auxiliary transmission temperature gauge (not shown), a transfer case oil temperature gauge 314h (shown in FIG. 4B), an electric current/ammeter gauge (not shown), and a trailer reservoir pressure gauge (not shown). According to an aspect, in the various content views, additional gauges may be available for display but may be suppressed from display when the additional gauges are within normal usage ranges (e.g., as opposed to out-of-parameter or warning ranges).

Figure 3D:
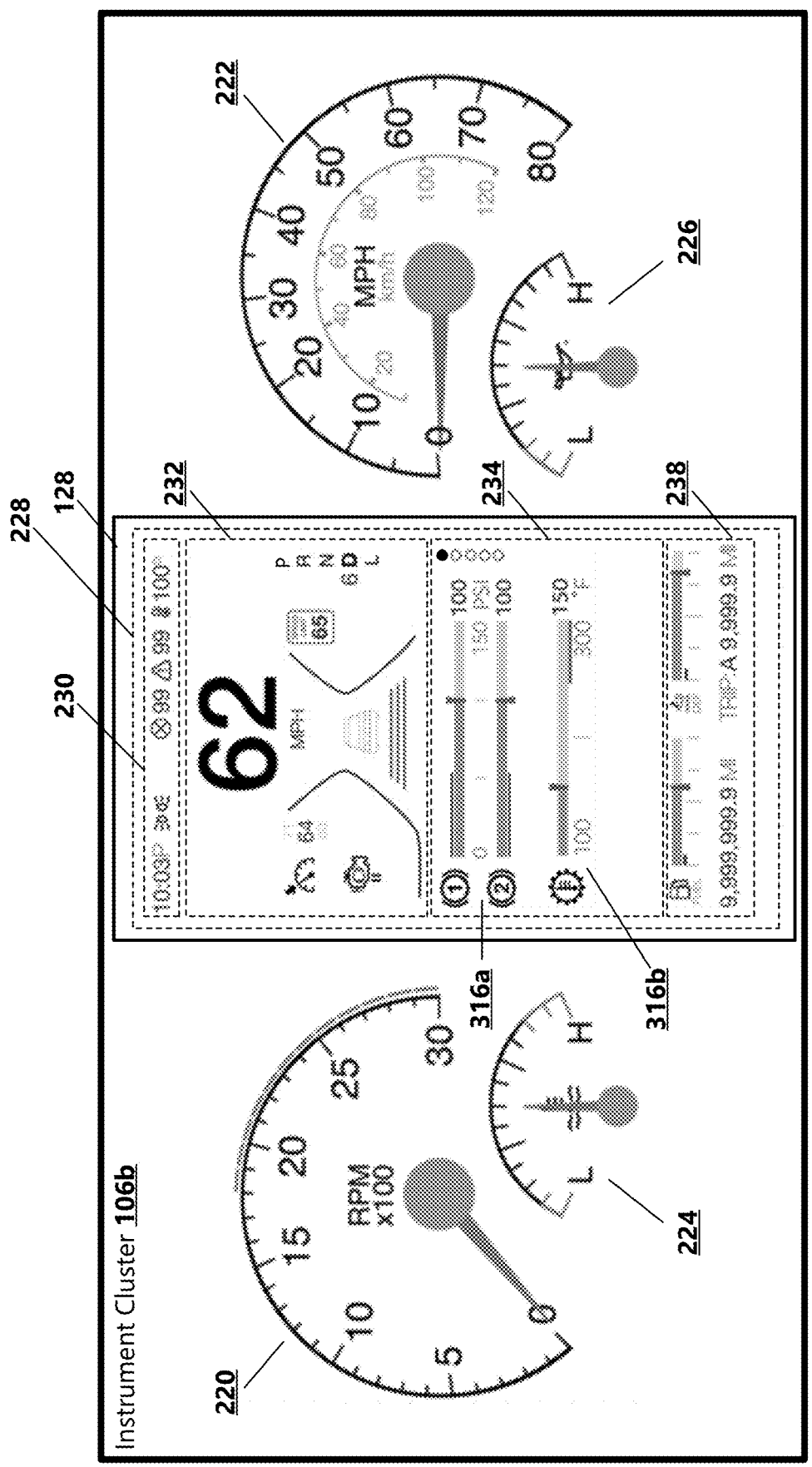
FIG. 3D is an illustration of an example instrument cluster comprising a vehicle status card with no active out-of-parameter or warning gauges.

With reference now to FIG. 3D, an instrument cluster 106b including various gauges and other vehicle status-related information displayed in an example card 228. The example card 228 includes various gauges 316a,b included in gauge containers within the dynamic content zone 234. Other cards may include a display of other (e.g., primary, secondary, user-selected, favorites, additional) gauges. In some examples, the gauges selected for inclusion in a particular card and the layout may be based on the truck order configuration and determinations made by the gauge layout application 130.

According to one aspect, a gauge may be classified into one of various gauge states. In some examples, the various gauge states include: an on-screen within-parameter state; a hidden within-parameter state; an out-of-parameter state; a warning state, and an on-screen state. For example, the on-screen within-parameter state may be associated with a 'normal' view of a gauge, that is, a gauge that is reporting a value within defined typical boundaries and is displayed in the content view/card 228 requested by the driver. The example gauges 302,312-316 shown in FIGS. 3A-D are in the on-screen within-parameter state.

In some examples, a gauge may be active but not displayed on the screen 128. These gauges are in the hidden within-parameter state. For example, because aspects of the flexible instrument cluster 106 display allow for gauge content to be minimized, on different cards 228, or available as sensors but do not have an active view configuration (i.e., on a favorites view or custom page, or available as a sensor on the vehicle 102, but not allocated to a gauge container within the gauge container placement schema), a gauge in the hidden within-parameter state may be in the background monitoring the status/measurement of a vehicle component. According to an aspect, when a gauge is in the hidden within-parameter state, the status of the monitored vehicle component is in bounds or within parameter. Accordingly, by virtue of the gauge not presenting itself to the driver, a gauge in the hidden within-parameter state conveys status information to the driver that the particular gauge is fine and does not need to be attended to.

A gauge may change from an on-screen or hidden within-parameter state to an out-of-parameter state when the gauge starts to exceed its normal operating condition. For example, a normal operating condition may be defined as when a measurement associated with a gauge is within a normal operating threshold, and the out-of-parameter state may be triggered with the measurement is outside of the normal operating threshold (e.g., above or below), but not within a warning threshold. According to an aspect, a gauge in the out-of-parameter state may be displayed as such to inform the driver to take note of the gauge, not to alarm the driver where he/she may think there may be a significant problem. In some examples, gauges may have an out-of-parameter display state where they are brought onto the screen 128 (if hidden) or highlighted (if currently displayed on-screen) via an animation and/or color change to draw the driver's attention to the out-of-parameter gauges.

According to an aspect, if a hidden gauge is brought onto the screen 128, and if the gauge has an assigned gauge container position (e.g., in the basic or enhanced content views), the gauge may be brought onto the screen 128 in the assigned gauge container position. According to another aspect, if a hidden gauge is brought onto the screen 128, and if the gauge does not have an assigned gauge container position (e.g., in the basic or enhanced content views), the gauge may be brought onto the screen 128 and displayed in a dynamic container 218, 236. Aspects of the out-of-parameter display state are described below with reference to example out-of-parameter display state gauges illustrated in FIGS. 4A-B. According to an aspect, the out-of-parameter display state may be configured to convey that the state is not a warning. According to another aspect, the out-of-parameter display state enables minimized viewed to be trusted and used by drivers in that drivers can trust that they will be shown information when they need it, prior to being in a warning state. Otherwise, hidden gauges may only warn the driver after there is already a problem.

The warning state may be associated with a typical 'red zone' warning. For example, a gauge may have a warning threshold, wherein when a value measured by the gauge meets or exceeds the starting value of the warning threshold, the state of the gauge may be changed to the warning state. The red zone or warning threshold may be associated with values at which damage to the vehicle 102 may occur. In some examples, gauges may have a warning display state where they are brought onto the screen 128 (if hidden) or highlighted (if currently displayed on-screen) via an animation, color change, and in some examples, an audible alert to draw the driver's attention to the warning state gauges. Aspects of the warning display state are described below with reference to example warning display state gauges illustrated in FIGS. 4B-C). In some examples and as described in further detail below, a pop-up notification associated with the gauge in the warning state may be displayed in the notification zone 212. In some examples, an out-of-parameter state gauge may transition to a warning state gauge. In some examples, a gauge may not have a warning state. For example, some gauges may be provided only to show magnitude of a measured value, and thus may be in an on-screen only state.

Figure 4A:
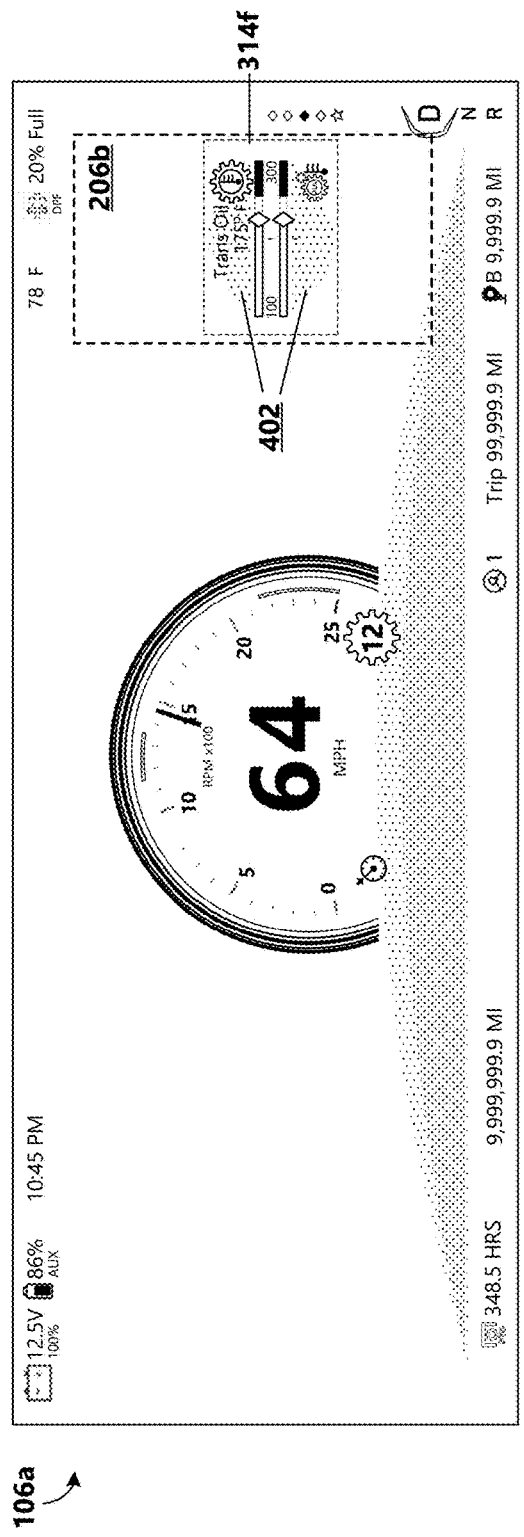
FIG. 4A is an illustration of the example instrument cluster of FIG. 3A, wherein an out-of-parameter gauge is displayed in an assigned container.

With reference now to FIG. 4A, an example of a gauge 314*f* is shown in an out-of-parameter display state in an assigned gauge container position in an example instrument cluster 106*a* in the minimized content view. For example, the example instrument cluster 106*a* illustrated in FIG. 3A may be displayed when the gauge 314*f* is in the hidden within-parameter state, and when an out-of-parameter condition is sensed in association with the gauge 314*f*, the state of the gauge 314*f* may be changed to the out-of-parameter state and brought onto the screen 128 for display to the driver as shown in FIG. 4A. In the example shown, the gauge 314*f* may have an assigned gauge container position (indicated by the dashed outline) in the right third gauge zone 206*b*. For example, in the enhanced content view shown in FIG. 3C, the transmission oil temperature gauge 314*f* is shown in the assigned gauge container position. In the minimized and basic content views, the transmission oil temperature gauge 314*f* may be in the hidden within-parameter state and thus may be hidden from display while in normal operating conditions.

Various gauge display properties may be associated with the out-of-parameter display state. For example, when a hidden gauge, such as gauge 314*f*, is brought onto the screen 128 when it goes into an out-of-parameter state, a dynamic animation may be used to call attention to it. Additionally, the gauge may be displayed with a level of salience that is increased from the normal in-parameter display state, but less than a warning state. In some examples, a particular color (e.g., white) may be associated with an in-parameter display state. For example, the particular color may denote that the gauge state is informational, and not a warning. In some examples, an icon of the vehicle component associated with the gauge may be displayed in the particular color. In some examples and as shown in FIG. 4A, a background glow 402 in the particular color may displayed in relation to the out-of-parameter gauge 314*f*. Other display properties/attributes associated with the out-of-parameter display state may include: a larger-than-normal size scale and displayed in the particular color, a temporary pulsing background glow 402, moving highlight of the scale (e.g., chaser effect) that may repeat and then become a stead glow, alternating between showing the gauge function text and the gauge value, etc. In some examples, display/presentation attributes associated with a gauge state may be based on a warning/salience level determined for the gauge/condition (described in detail below). As should be appreciated, additional or alternative display properties may be used to increase salience in a subtle way prior to warning to help prevent component damage.

Figure 4B:
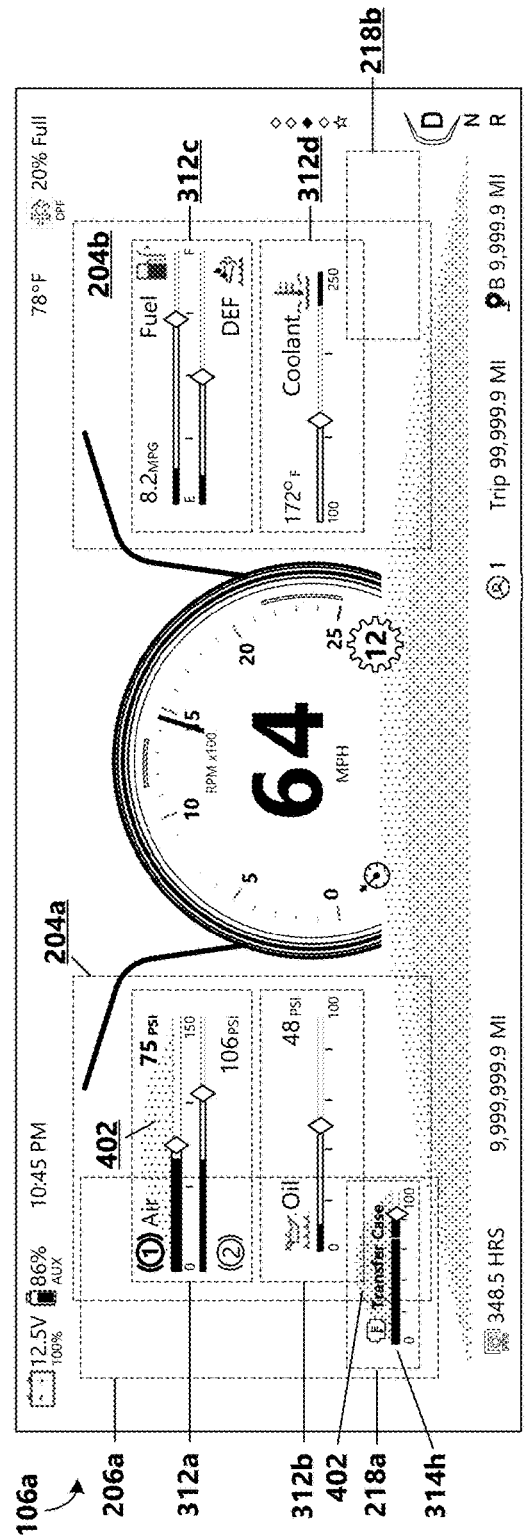
FIG. 4B is an illustration of the example instrument cluster of FIG. 3B, wherein a previously-displayed gauge is transformed to an out-of-parameter gauge, and a warning gauge is displayed in a dynamic container.

With reference now to FIG. 4B, another example gauge 312*a* is shown in an out-of-parameter display state in an assigned gauge container position in an example instrument cluster 106*a* in the basic content view. For example, the example instrument cluster 106*a* illustrated in FIG. 3B may be displayed when the gauge 312*a* is in the on-screen within-parameter state, and when an out-of-parameter condition is sensed in association with the gauge 312*a*, the state of the gauge 312*a* may be changed to the out-of-parameter state and may be displayed in the out-of-parameter display state to inform the driver of the change in condition/state of the gauge 312*a* as shown in FIG. 4B.

With reference still to FIG. 4B, an example gauge 314*h* is shown in a warning display state in a dynamic container 218*a*. For example, the gauge 314*h* may previously be in an out-of-parameter state, and when a warning condition is sensed in association with the gauge 314*h*, the state of the gauge 314*h* may be changed to the warning state and displayed in a warning display state for alerting the driver of the warning state as shown in FIG. 4B. In the example shown, the gauge 314*h* may not have an assigned gauge container position in the second gauge zones 204 nor in the third gauge zones 206. Accordingly, when the gauge 314*h* is brought onto the screen 128, the gauge 314*h* may be displayed in a dynamic container 218*a*.

Dynamic containers 218, 236 may be used to ensure non-visible gauges can be displayed when the gauges enter into an out-of-parameter or warning state. Various display properties and rules may be associated with dynamic containers 218, 236. In some examples, a dynamic container location may be conditional and may only appear when needed. In some examples, a dynamic container 218, 236 may become non-visible again when the gauge displayed returns to a normal operating state. In some examples, hidden gauges not currently visible in the currently selected display view and that have an assigned location within a content display view may not use the dynamic container 218, 236 and instead, may be displayed in its assigned location when needed (e.g., as described above with reference to the display of the out-of-parameter gauge 314*f* in FIG. 4A. In some examples, when a dynamic container 218, 236 is displayed, other gauges displayed in the enhanced content view, favorites view, or card 228 may be reduced to a compact/short format to make space available for the dynamic container. In some examples, each dynamic container 218, 236 may include one out-of-parameter or warning state gauge. In some examples, two dynamic containers 218 may be displayed at a same time (e.g., a left dynamic container 218*a* and a right dynamic container 218*b*), wherein a higher priority gauge may be populated in the left dynamic container 218*a*. In some examples, if more than two hidden gauges change state and are determined to be displayed in a dynamic container 218, 236, the dynamic container may cycle a display of the gauges (e.g., every T seconds). As should be appreciated, additional or alternative rules and display properties may be used to display non-visible gauges when the gauges enter into an out-of-parameter or warning state.

With reference still to FIG. 4B, when the example gauge 314*h* is shown in the warning display state, the gauge may be displayed in such a way as to indicate that the represented function has exceeded a warning threshold and is outside the expected limits or ranges. Various gauge display properties may be associated with the warning display state, wherein the display state corresponds with attributes of various salience levels. In some examples, the color of the gauge may transition to a different, more salient color than in the out-of-parameter display state. In some examples, when the gauge transitions into the warning state, the gauge bar indication, labeling text, and/or icon may be shown in the more-salient color, may have an animated (e.g., pulsating) background glow in the more-salient color, and may include a moving red highlight/glow of the gauge scale (e.g., a chaser effect) that my repeat for a specified number of times and then glow steadily. In some examples, if the warning state gauge is part of a super gauge, the portion of the super gauge associated with the warning state may be displayed in the warning display state. According to an aspect, a gauge may continue to be shown in the warning display state until the parameter drops below its warning threshold. As should be appreciated, additional or alternative display properties may be used to increase salience in an obvious way to warning the driver of potential component damage.

In some examples, a gauge may not have an out-of-parameter state. For example, the gauge may have a normal state and a warning state, wherein the gauge may be in the warning state when a value measured by the gauge meets or exceeds the starting value of the gauge's red state or warning threshold. A normal state gauge may be on-screen or hidden (e.g., based on determinations made by the gauge layout application 130), and a warning state gauge may be brought onto the screen 128 (if hidden) or highlighted (if currently displayed on-screen) via an animation and/or color change to draw the driver's attention to the red state (i.e., warning) gauges.

Figure 4C:
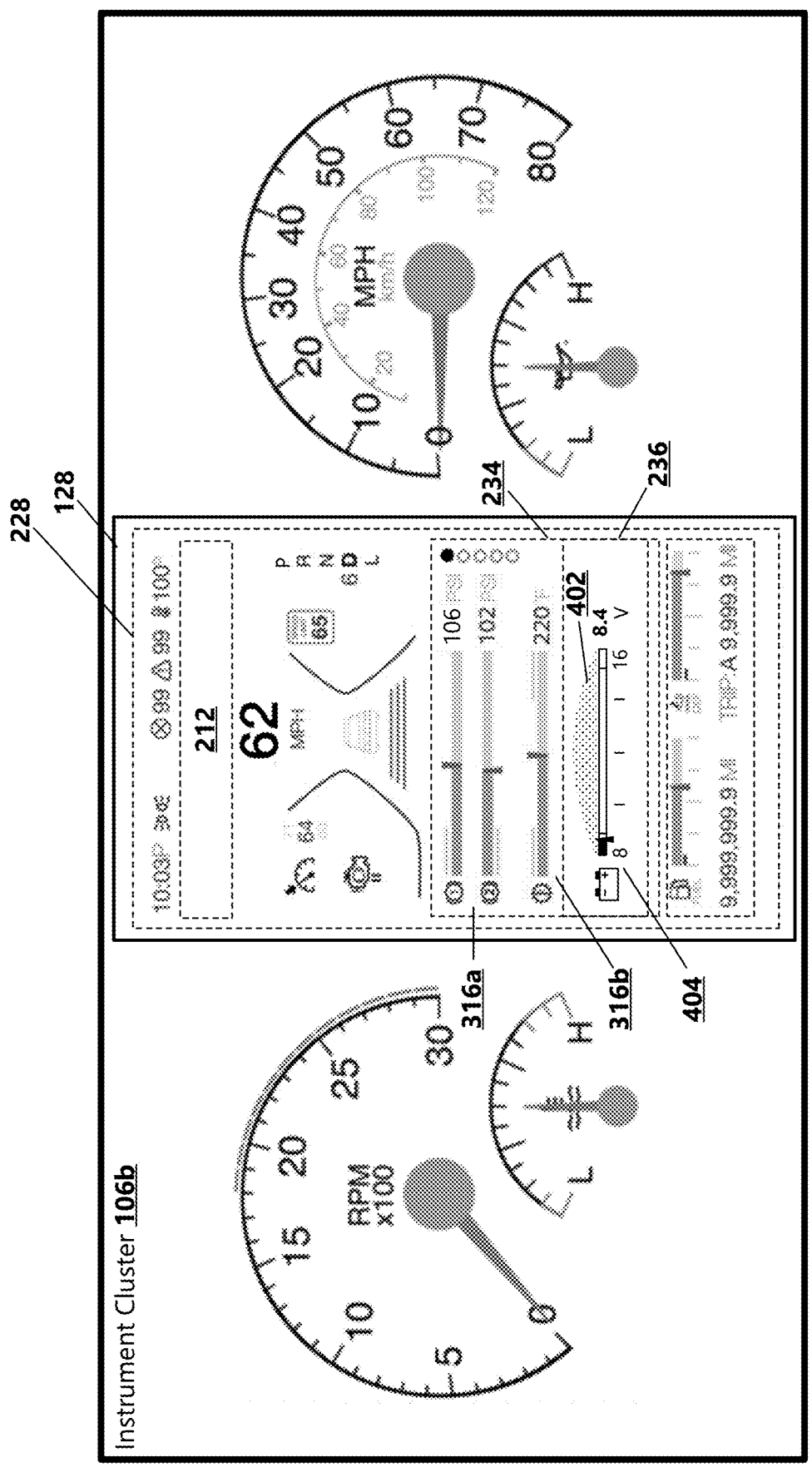
FIG. 4C is an illustration of the example instrument cluster of FIG. 3D, wherein displayed gauges are compacted to allow room for a warning state gauge to be displayed in a dynamic container.

For example and as illustrated in FIG. 4C, an example battery charge gauge 404 is shown displayed in a dynamic container 236 position in an example card 228 displayed in an instrument cluster 106b. For example, the instrument cluster 106b illustrated in FIG. 3D shows an example dynamic content zone 234 of a card 228 that may be displayed when the example battery charge gauge 404 is in a hidden normal state. When a warning condition is sensed in association with a hidden gauge 404, the state of the gauge 404 may be changed to a warning state and may be displayed in the warning display state to inform the driver of the change in condition/state of the gauge 404 as shown in FIG. 4C. According to an aspect, when a gauge or super gauge that is not currently displayed on-screen enters a not normal-operating range state, it may appear in a dynamic container 236 at the bottom of the screen 128. Further, in some examples and as illustrated in FIG. 4C, when a dynamic container 236 appears, content currently displayed on-screen may be minimized to accommodate the new container and to shift focus on the warning state gauge or super gauge. If the state is corrected to the normal state, the dynamic container 236 may be dismissed, and minimized content will return to its normal state.

According to another aspect, an on-screen gauge that changes from a normal state to a warning state may not require use of the dynamic container 236 to be displayed in the warning state. For example, the display state of the on-screen gauge may transition to a warning display state. In some examples, if the dynamic container 236 is used to show a warning state of a hidden gauge, a visible gauge in the warning state may transition to a compact format and remain in warning state. In some examples, if more than one gauge or super gauge enters a warning state at the same time, or a new gauge or super gauge enters a warning state while a gauge or super gauge is currently in a warning state, each individual gauge or super gauge may automatically rotate every N seconds within the dynamic container 236. In some examples and as described in further detail below, a popup notification may be displayed in a notification zone 212 included in the displayed card 228. As should be appreciated, additional or alternative display properties may be used to notify the driver of gauges that are operating out of normal-state via a displayed card 228 in an instrument cluster 106b.

In some examples, a popup notification (sometimes referred to as a popup warning) may be displayed on the screen 128 to alert the driver of a prioritized message, wherein the message may be prioritized based on safety relevance, operational relevance, and timeframe. For example, given the sheer number of possible messages/warnings that can to be communicated to the driver in association with the vehicle's status, and further given the various varieties of severities of the messages/warnings, the warning and notification application 124 may be configured to use a priority schema to prioritize messages and to select a top-priority message to display as a popup notification in the notification zone 212.

In some examples, a popup notification may be primarily intended for view while driving (no parking brake set); however a popup notification may also be displayed when parking brakes are set. While parking brakes are set, all popup notifications may be suppressible (e.g., to allow for menu access). A popup notification may help to reduce information overload and improve the user experience. For example, a popup notification may be displayed when a fault or a need to message the driver is triggered. A popup notification may have a specific format of text, layout, and color. The presentation of popup notifications to the driver may improve the driver's situational awareness to help protect the vehicle 102 from damage and/or person from injury.

Figures 5A, 5B:
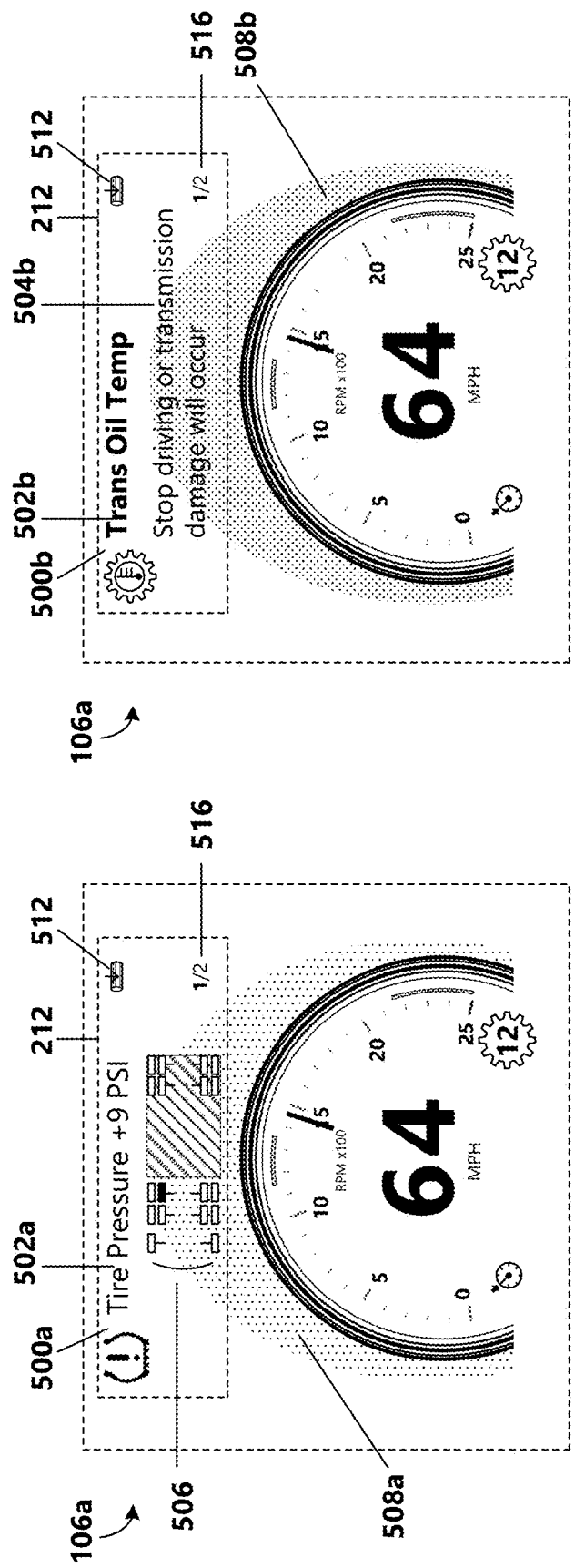
FIG. 5A is an illustration of an example amber salience-level (not critical) popup notification displayed in a notification zone in an instrument cluster.
FIG. 5B is an illustration of an example red salience-level (critical) popup notification displayed in a notification zone in an instrument cluster.
Figures 5C, 5D:
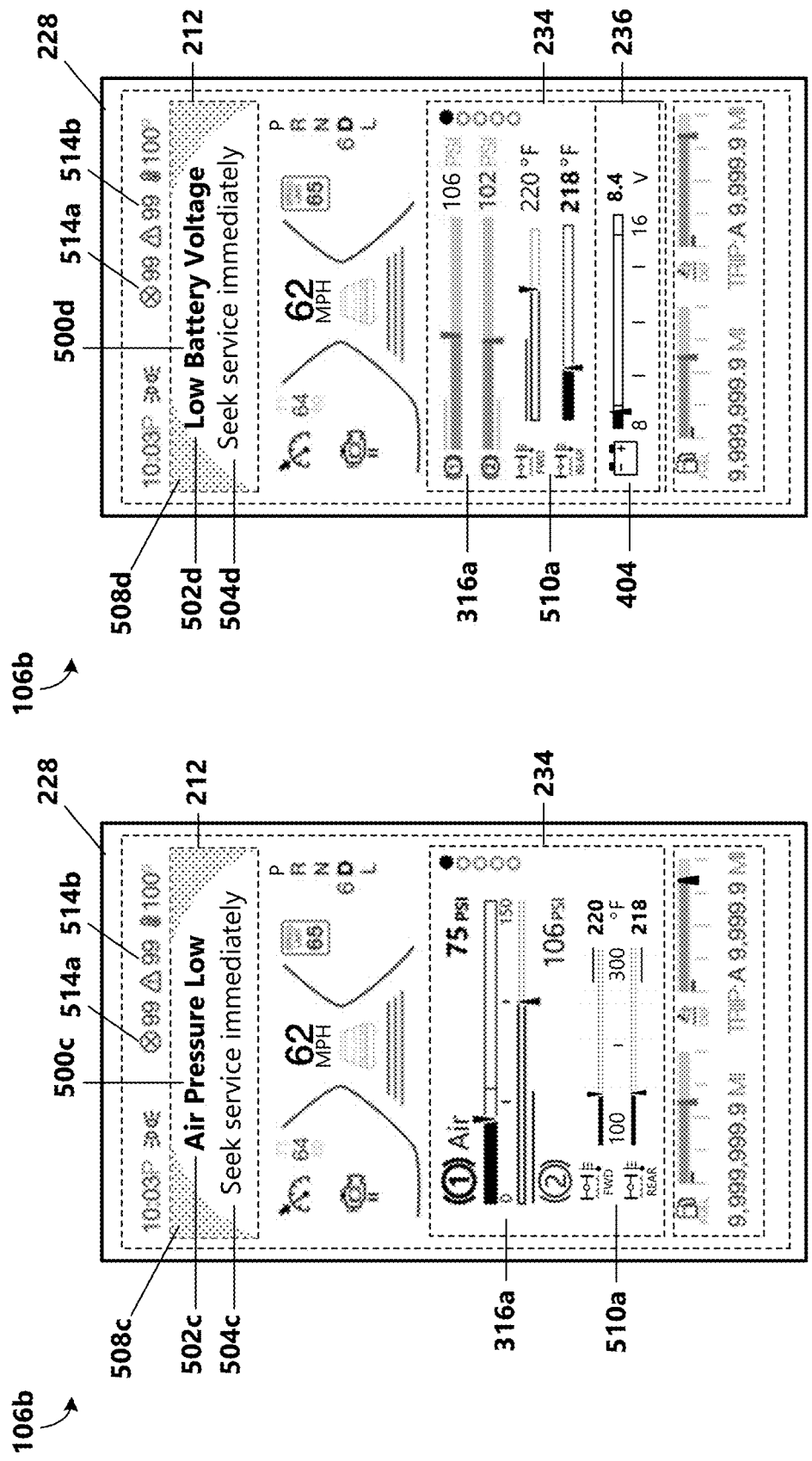
FIG. 5C is an illustration of an example warning popup notification displayed in a notification zone in an instrument cluster and a corresponding gauge indicating the warning condition.
FIG. 5D is an illustration of an example warning popup notification displayed in a notification zone in an instrument cluster, a corresponding gauge indicating the warning condition, and another warning state gauge.

With reference to FIGS. 5A-D, various example popup notifications 500a-d (generally 500) are shown. The popup notification 500a shown in FIG. 5A is illustrative of a popup notification associated with an out-of-parameter state gauge, the popup notification 500b shown in FIG. 5B is illustrative of a popup notification associated with a warning state gauge, the popup notification 500c shown in FIG. 5C is illustrative of a popup notification associated with a warning state gauge, and the popup notification 500d shown in FIG. 5D is illustrative of a popup notification associated with a warning state gauge that may be selected for display over another warning state gauge based on a priority level/message severity classification determined based on safety relevance, operational relevance, and time. For example, two gauges are shown to be in a warning state: a forward and rear axle oil temperature super gauge 510a located in the dynamic content zone 234, and a battery charge gauge 404 located in the dynamic container 236. For example, the forward and rear axle oil temperature super gauge 510a may have an assigned position in the displayed card 228 (e.g., such as shown in FIG. 5C), and when its state changes to a warning state, the gauge 510a may be transitioned into a warning display state according to a determined salience level. Additionally, the battery charge gauge 404 may be brought onto the screen from a hidden state and placed in the dynamic container 236. As shown, a popup notification 500d is selected to be displayed in the notification zone 212 in association with the warning state of the battery charge gauge 404. As will be described in further detail below, a message associated with the warning state of the battery charge gauge 404 may be determined to rank higher in priority than a message associated with the non-normal state of the rear axle oil temperature gauge, wherein the priority ranking may be based on an evaluation of the messages' safety relevance, operational relevance, and time.

In some examples, a popup notification 500 may be classified into one of four types, in high to low order in terms of saliency: non-suppressible messages, acknowledgeable messages, suppressible messages, and self-suppressing. For example, non-suppressible messages may include popup notifications 500 determined to be urgent enough that, when present, persist on the screen and the driver cannot push them to the background while driving. For example, a non-suppressible popup notification 500 may be associated with a critical message, where the driver may need to take an action or the condition may have to be corrected for the message to be removed. While parked, all popup notifications 500 may become suppressible, but may then be redisplayed if the vehicle 102 returns to the driving state and the condition still exists.

An acknowledgeable message may include a popup notification 500 that has been acknowledged by an input device and removed from the screen 128. A telltale or gauge warning state may remain as indicators that the condition still exists. In such a case, an icon or graphic symbol 506 (shown in FIG. 5A) used in the popup notification 500 may become a virtual tell-tale that may be dynamically updated to represent the gauge condition. For example, the virtual tell-tale can replace text content.

A suppressible message may include a popup notification 500 that can be manually pushed into the background and removed from the screen 128 by the driver via actuation of the cluster control 122. For example, a suppressible message may remain in queue (i.e., in a main stack list as will be described in detail below) while the warning condition still exists.

A self-suppressing message may include a popup notification 500 that may have a display timer and/or when conditions change, may be automatically removed from the screen 128 without driver involvement.

A popup notification 500 may have a particular format. In one example, a top line of the popup notification 500 may be configured to include a title 502 denoting the system or issue causing the message. In some examples and as shown in FIGS. 5A-D, the textual title 502 may include a name or abbreviation of the out-of-parameter/warning/out-of-normal state gauge. In some examples and as shown in FIGS. 5A, C, and D, the textual title 502 may further include an indication of the out-of-parameter/warning/out-of-normal condition (e.g., low, high, value associated with out-of-parameter/warning/out-of-normal condition state).

In some examples, below the title, a command-level instruction 504 may be included. According to an aspect, the command-level instruction 504 may be instructions or a directive on what the driver should do about the out-of-parameter/warning/out-of-normal condition. Some examples of possible command-level instructions 504 include a "Stop driving or transmission damage will occur" instruction 504b as shown in FIG. 5B and a "Seek service immediately" instruction as shown in FIGS. 5C,D. As should be appreciated, various other command-level instructions 504 are possible and may be displayed in association with a popup notification 500. As illustrated, in some examples, a displayed popup notification 500 may further include a graphic symbol 506 as shown in FIG. 5A that may further convey information about the vehicle component or system needing the driver's attention.

According to an aspect, a popup notification 500 may be displayed in a particular color and with a particular degree or level of salience based on a warning/priority level or message severity classification determined based on safety relevance, operational relevance, and time. In some examples, a popup notification 500 may be displayed in one of three colors: white, amber, or red, and may further be presented with animation effects (e.g., flashing), sound (e.g., audible alerts, dings, or other sound clips), or haptic feedback for increased salience. In some examples, certain criteria may be evaluated for determining a warning/salience level and sub-level, wherein a particular warning/salience level (e.g., levels 1-7) may correspond to a display color (e.g., white, amber, or red) and other presentation attributes (e.g., animation effects, sound, haptic feedback) corresponding to salience.

In some examples, a navigation cue 512 (shown in FIGS. 5A,B) may be included in a popup notification 500 that may give the driver a reference as to whether the message is suppressible or must remain on-screen. In some examples and as illustrated in FIGS. 5C,D, a counter 514 of a number of all active level 1-6 messages (e.g., an amber message counter 514a and a red message counter 514b). Additionally and as illustrated in FIGS. 5A,B, a numerical queue position indicator 516 may be included as an aid in the understanding of a total count and relative position corresponding to criticality/urgency of the popup notification 500 amongst active messages in a main stack of active messages (described in detail below).

In some examples, the color white may be used for a popup notification 500 that may be information and that may not include a known hazard or operational risk. A white popup notification 500 may not be presented with flashing or sound. In some examples, the color amber may be used for a popup notification 500 that may include operational relevance-related information, such as to notify the driver of a system that he/she may need to monitor as vehicle operation is continued. In some examples, an amber popup notification 500 may be presented according to various saliency sub-levels. For example, a low sub-level amber popup notification 500 may be displayed as solid amber, and an audible ding may be played when the popup notification 500 is initially displayed. As another example, a mid sub-level amber popup notification 500 may be presented with increased saliency, such as a continuously flashing notification, and an audible ding may be played when the popup notification 500 is initially displayed. As another example, a high sub-level amber popup notification 500 may be presented with further increased saliency, such as a continuously flashing notification, and a repeating audible ding may be played. An example of an amber popup notification 500a is shown in FIG. 5A. In some examples and as shown in FIG. 5A, an amber-colored background glow 508a may be displayed in the background area behind or around an amber-level popup notification 500a.

In some examples, the color red may be used for a popup notification 500 that may include very high safety relevance or operational relevance, such as to notify the driver that the vehicle 102 needs to be pulled over immediately. In some examples, a red popup notification 500 may be presented according to various saliency sub-levels. For example, a low sub-level red popup notification 500 may be displayed as solid red, and an audible ding may be played when the popup notification 500 is initially displayed. As another example, a mid sub-level red popup notification 500 may be presented with increased saliency, such as a continuously flashing notification, and an audible ding may be played when the popup notification 500 is initially displayed. As another example, a high sub-level red popup notification 500 may be presented with further increased saliency, such as a continuously flashing notification, and a repeating audible ding may be played. An example of a red popup notification 500b,c,d is shown in FIGS. 5B-D. In some examples and as shown in FIGS. 5B-D, a red-colored background glow 508b-d may be displayed in the background area behind or around a red-level popup notification 500b-d.

According to an aspect, as part of determining a salience level and sub-level of a popup notification 500, the warning and notification application 124 may be operative or configured to rate the popup notification 500 in terms of safety relevance, operational relevance, and timeframe. In some examples, a first set of criteria may be utilized to rate a popup notification 500 based in terms of safety relevance, operational relevance, and timeframe, wherein the first set of criteria may be relevant to a truck, and may result in a determination of a salience level. In some examples, a numerical value for safety, operational, and timeframe relevance may be determined, and a relevance rating may be determined based on the relevance value. A determined salience level may dictate display/presentation attributes of the popup notification 500 as described above (e.g., color, flashing vs continuous, audible alert). For example, the display/presentation attributes may be configured to match a perceived urgency relative to the message severity/criticality.

In some examples, a popup notification 500 may be rated for safety relevance ranging from no relevance (e.g., a safety relevance rating of 3) to severe/high relevance (e.g., an operational relevance rating of 1), wherein the relevance rating may represent the degree to which the information may affect safe operation of the vehicle 102 or those around it. A popup notification 500 with no relevance may describe a popup notification 500 where there may be no injury risk (e.g., within reason) if the popup notification 500 were to be ignored. For example, the popup notification 500 may be purely information. One example of a popup notification 500 that may have a no safety relevance rating may be a warning that a service interval is past due or about the capability of a vehicle system. A popup notification 500 with moderate safety relevance may describe a popup notification 500 that may inform the driver of the risk of a hazard that could cause moderate injury to them or others if not attended to (e.g., a warning of hot exhaust temperature that could cause burns or start a fire). A popup notification 500 rated as severely safety relevant may describe a popup notification 500 where seeing the popup notification 500 is likely to cause a reaction that may prevent a severe or fatal injury to the driver or others. One example of a popup notification 500 that may have a severe safety relevance rating may be a command for the driver to take over braking because forward collision avoidance system cannot brake hard enough on its own.

In some examples, a popup notification 500 may be rated for operational relevance ranging from low relevance (3) to high relevance (1), wherein the operational relevance rating may represent the degree to which the information may increase the ease and/or convenience of a driving task, including aspects of completing an assigned (daily) mission. The severity of a mechanical breakdown, for example, may have a high impact on the operational relevance rating. As an example, a popup notification 500 with low operational relevance (e.g., an operational relevance rating of 3) may include a popup notification 500 that may be purely informational or that may convey how to use a system correctly, wherein ignoring the message may result in no reasonable risk of damage to the vehicle. An example of a popup notification 500 that may have a low operational relevance risk may include a popup notification 500 including the vehicle's results of fuel economy performance for the day, or what the pressure is in a lift-able axle system.

A popup notification 500 with moderate operational relevance (e.g., an operational relevance rating of 2) may describe a popup notification 500 informing that moderate damage to the vehicle 102 is possible if ignored. In some examples, the amount of damage that may be associated with the popup notification 500 may be based on repair costs of the associated out-of-parameter/warning vehicle component/system. For example, if damage is likely to occur due to ignoring the message, a popup notification 500 may be rated as moderately operationally relevant if repair costs are likely to be less than a certain price threshold (e.g., $3000) and/or based on the likelihood the vehicle 102 may be able to complete its daily or weekly mission. In one example, a tire pressure measure slightly below an ideal pressure may be rated as moderately operationally relevant.

A popup notification 500 rated as severely/highly operationally relevant (e.g., an operational relevance rating of 1) may describe a popup notification 500 informing the driver that permanent or severe damage is likely to occur to the vehicle 102. If the damage were to occur due to ignoring the message, a severe operational relevance rating may be attributed to the popup notification 500 based on a likelihood of the vehicle not being operational enough to complete its mission (delivery within the day or week) and/or if a likely cost of system damage may exceed a certain price threshold (e.g., $3000) to repair. As an example, if the engine or transmission oil level is measured to be at a level that is so low that it is in danger of destroying its ability to operate, the associated popup notification 500 may be rated as severely operationally relevant.

In some examples, a popup notification 500 may be rated for timeframe relevance ranging from discretionary to emergency, wherein the timeframe relevance rating may represent the degree to which the information is time sensitive for the driver to attend to the popup notification 500, and/or to make a decision on how to react to the popup notification 500.

As an example, a popup notification 500 that may be rated as discretionary (e.g., timeframe relevance rating of E) may represent a popup notification 500 that may not have a time consequence or that may have a relatively long term time consequence. For example, a discretionary popup notification 500 may not include a direct or immediate decision required by the driver (e.g., the driver contemplating the information in excess of a time threshold (e.g., two minutes) may have no consequences. An example of a discretionary popup notification 500 may include a low fuel warning where there is still ⅛ of a tank of fuel remaining.

As another example, a popup notification 500 that may be rated with a preparation-to-respond or preparatory time relevance rating (e.g., timeframe relevance rating of D) may represent a popup notification 500 where the driver may have a predetermined time interval (e.g., between 20 seconds and 2 minutes) to act on the information presented (e.g., enough time to read the notification and to decide between multiple alternatives). As an example, a popup notification 500 associated with an axle that is just starting to exceed its operating temperature due to high torque application may be rated with a preparation-to-respond time relevance rating.

As another example, a popup notification 500 may be rated as near-term (e.g., timeframe relevance rating of C) when the driver may need to read the notification, and make a decision or take an action within a shorter timeframe (e.g., 10 to 20 seconds) based on the information provided. As another example, a popup notification 500 may be rated as immediate (e.g., timeframe relevance rating of B) when the driver may need to read the notification, and make a decision or take an action within an even shorter timeframe (e.g., 3 to 10 seconds) based on the information provided. A near-term or immediate rated popup notification 500 may be associated with a warning that may require the driver to detect the notification and react as instructed. An example of a popup notification 500 rated as near-term or immediate may include a command to shut off the engine and pull to the side of the road, wherein the driver may have to decide if it is safe to do so and to react.

As another example, a popup notification 500 may be rated with an emergency time relevance (e.g., timeframe relevance rating of A) when the driver may need to read the notification and make a decision or take an action within an immediate timeframe (e.g., within 3 seconds). An emergency popup notification 500 may be associated with a warning that may require an automated response from the driver. As example of a popup notification 500 rated as emergency may include a command for immediate full application of braking.

According to an aspect, based on a safety, operational, and timeframe relevance rating determined for a popup notification 500, a salience/severity/warning level associated with display/presentation attributes 604 of the popup notification 500 may be determined. In some examples, a decision matrix tool, such as an example decision matrix tool 600 shown in FIG. 6, may be used to assign a salience/criticality/warning level 602. As an example, a popup notification 500 with a severe (1) safety relevance rating and a high (1) operational rating and a near-term, immediate, or emergency (A) time relevance rating may be determined to have a level 1 salience level that may be associated with a red alert and a sub-level salience level that may be associated with further increased salience, such as a continuously flashing notification and a repeating audible alert.

In some examples, as part of determining a salience level and sub-level of a popup notification 500, the warning and notification application 124 may be further operative or configured to rate the popup notification 500 in terms priority based on a second set of evaluation criteria. For example, the second set of evaluation criteria may be associated with an automotive standard (e.g., SAE2395 FEB2002 and ISO 16951 standards) that can be used for characterizing message priority. In some examples, based on the second set of criteria, a set of safety, operational, and timeframe values/ratings may be determined for a popup notification 500 and used to determine a POI rank/level. For example, POI definitions may facilitate with ranking in-vehicle messages in terms of importance. In some examples, there may be as many as 45 POI levels ranking from a lowest priority level (45) to a highest priority level (1). In some examples, a POI rank/level may also correspond with salience levels 602, wherein a level of salience may have particular presentation features/attributes 604 (e.g., color, flashing behavior, sound files). As an example, a message with a safety relevance of 2, an operational relevance of 1, and an immediate timeframe may be determined to have a POI level of 11, which may correspond with a salience level of 2. For example, a salience level of 2 may include the use of red coloring, flashing behavior, and sound. In some examples, POI definitions may be less relevant (than the first set of evaluation criteria) to trucks. As should be appreciated, a POI level alone may not correlate importance with an appropriate salience level and may not provide for handling conflicts arising from multiple equally-critical triggering in the same time. According to an aspect, the POI level may be used by the warning and notification application 124 as part of arbitrating between multiple active messages (i.e., notifications associated with multiple gauges that may be in an out-of-parameter or warning gauge state) for determining message is in a top priority position for display as a popup notification 500 in the notification zone 212.

Figure 7:
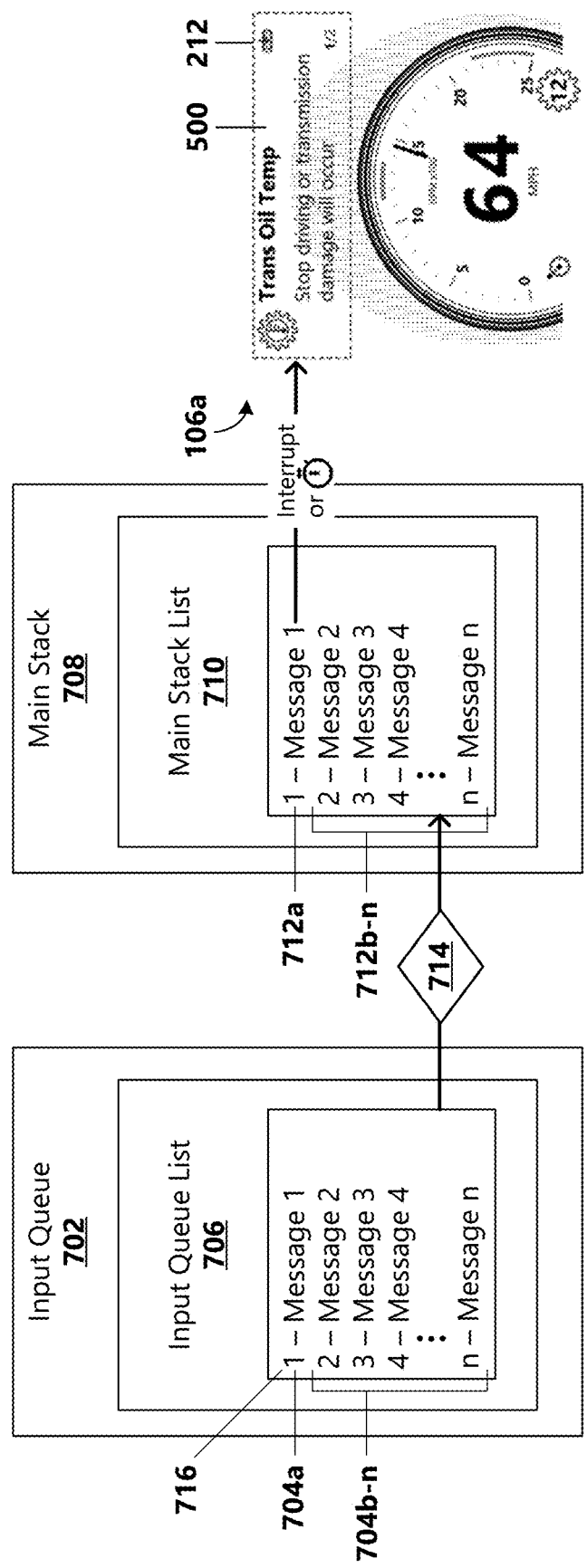
FIG. 7 is an illustration of an input queue and master stack used to store and order active messages by salience level.

In some examples and as illustrated in FIG. 7, when an initiation condition is met (e.g., a message is received in association with a gauge that may be in an out-of-parameter or warning gauge state), the message may be added to an input queue 702. According to an aspect, the input queue 702 is illustrative of a hidden memory operative or configured to store an IQ list 706 of all active messages 704a-n (generally 704). For example, the input queue 702 may be used to order active messages 704 according to a popup notification priority ranking 716 based on, respectively: criticality (i.e., salience level 1-2, then salience level 3-7), POI level (i.e., lower POI # to higher POI #), and order of occurrence (i.e., first to last). The IQ list 706 may be used for determining a highest-ranking (i.e., according to popup notification priority ranking 716) input queue message (referred to as a top IQ message 704a). In some examples, the top IQ message 704a may be elected based a highest-ranked message in the IQ list 706, with priority given to a highest-ranked message that has not been previously shown. For example, the top IQ message 704a may be elected based in order of: un-shown critical messages, shown critical messages, un-shown non-critical temporary messages, shown non-critical temporary messages, un-shown non-critical non-temporary messages, then shown non-critical non-temporary messages, wherein salience levels 602 1 and 2 may be defined as critical.

According to an aspect, the warning and notification application 124 may be operative or configured to make a determination 714 as to whether to show the top IQ message 704a as a popup notification 500 in the notifications zone 212 for display to the driver, and if so, when. The determination 714 may be based on an evaluation of the top IQ message 704a against a current top main stack (MS) message 712a that may be currently displayed on-screen as a popup notification 500 in the notifications zone 212. For example, a main stack 708 is shown in FIG. 7, wherein the main stack 708 may comprise an ordered list (main stack (MS) list 710) of active messages 712a-n (generally 712) that may be accessible to the driver via the digital display. For example, a top MS message 712a in the MS list 710 may be currently displayed on-screen as a popup notification 500. The determination 714 regarding whether/when to show the top IQ message 704a as a popup notification in the notifications zone 212 may be based on the evaluation of the top IQ message 704a against the current top MS message 712a (i.e., current on-screen popup notification 500). For example, the result of the determination may be a decision regarding whether and when (e.g., immediately or after a minimum display time for the current on-screen popup notification 500 has passed) to replace the current top MS message 712a with the top IQ message 704a. When a top IQ message 704a replaces the current top MS message 712a, it may be re-labeled as the top main stack (MS) message 712a, and may be displayed as a popup notification in the notifications zone 212, replacing the previous popup notification 500. For example, the determination 714 may be made based at least in part on whether the current top MS message 712a and/or the top IQ message 704a is a critical message (e.g., salience levels 1 and 2). The determination may further be made based on one or a combination of: whether the top IQ message 704a is a temporary notification, the POI level of the top IQ message 704a in comparison with the current top MS message 712a, whether the current on current top MS message 712a is a temporary notification, and a length of time the current on current top MS message 712a has been displayed.

With reference to FIG. 8, an example arbitration matrix 800 is shown that may be used to decide whether/when to display the top IQ message 704a. The example arbitration matrix 800 may be configured to prefer critical over non-critical temporary over non-critical non-temporary messages. For example, if the current top MS message 712a is critical (e.g., salience levels 1 or 2) and if the top IQ message 704a is also critical, a determination may be made to replace the current top MS message 712a with top IQ message 704a. The warning and notification engine 124 may be further operative or configured to determine whether to replace the current top MS message 712a with top IQ message 704a immediately (and thus interrupt the display of the current on-screen popup notification 500), or after the current top MS message 712a (i.e., current on-screen popup notification 500) has been displayed for at least the minimum display time associated with the notification. For example, based on the arbitration matrix 800, the POI levels of the current top MS message 712a and the top IQ message 704a may be compared, and if the top IQ message 704a has a lower POI level (i.e., lower POI #) than the current top MS message 712a, a determination may be made to interrupt the display of the current on-screen popup notification 500 by immediately replacing the current top MS message 712a in the main stack 708 with the top IQ message 704a. Else, if the top IQ message 704a has an equal or higher POI level (i.e., higher POI #/is less critical) than the current top MS message 712a, a determination may be made to replace the current top MS message 712a in the main stack 708 with the top IQ message 704a after the minimum display time of the current on-screen popup notification 500. According to an aspect, the minimum display time may be the minimum amount of time in which a popup notification 500 may be required to be shown to the driver before it can be replaced by another message of equal or lower importance. In some examples, importance may be based on whether the message is critical or non-critical, and may be further based on whether the message is temporary or non-temporary (if non-critical). A message show timer may initiate when the top IQ message 704a is moved to the main stack 708.

In some examples, when a top IQ message 704 replaces a top MS message 712a in the main stack 708, all messages 704 in the IQ list 706 may be moved to and replace the messages 712 in the MS list 710. In some examples the driver may be enabled to navigate through the active MS messages 712 in order of the MS list 710 (e.g., when in a manual mode). In manual mode, a new critical-level (saliency level 1-2) top MS message 712a may force transition into automatic mode, wherein the new critical message may be allowed to interrupt and show.

In some examples, when in an automatic mode, the top MS message 712a may be displayed for its minimum display time, and then a next message 704 in the MS list 710 may be displayed for its minimum display time. In some examples, a message deactivation timer may be used to assign a maximum amount of time after which a non-critical temporary message may be automatically deactivated if not displayed to the driver. As should be appreciated, various other decisions may be made as part of determining which message to shown and when as illustrated in the example arbitration matrix 800.

In some examples, a determination may be made to hold (i.e., not replace the current top MS message 712a with the top IQ message 704a). As shown in the example arbitration matrix 800, this determination may be made when the current top MS message 712a is critical and the top IQ message 704a is non-critical. In some examples and as shown, this determination may also be made when the top MS message 712a is non-critical and temporary and the top IQ message 704a is non-critical and non-temporary or when the top IQ message 704a is also non-critical and temporary and has an equal or higher POI level than the top MS message 712a. According to an aspect, when a hold determination is made, the IQ list 706 (including the top IQ message 704a) may be re-ordered according to the popup notification priority ranking 716 (i.e., based on, respectively: criticality (i.e., salience level 1-2, then salience level 3-7), POI level (i.e., lower POI # to higher POI #), and order of occurrence (i.e., first to last)). For example, the un-shown messages are not prioritized over the shown messages such as when the top IQ message 704a was elected. The re-ordered IQ list 706 may replace the current MS list 710 below the current top MS message 712a, unless the lists are the same. The driver may be enabled to manually scroll/navigate through and display popup notifications 500 for the active MS messages 712.

Figure 9A:
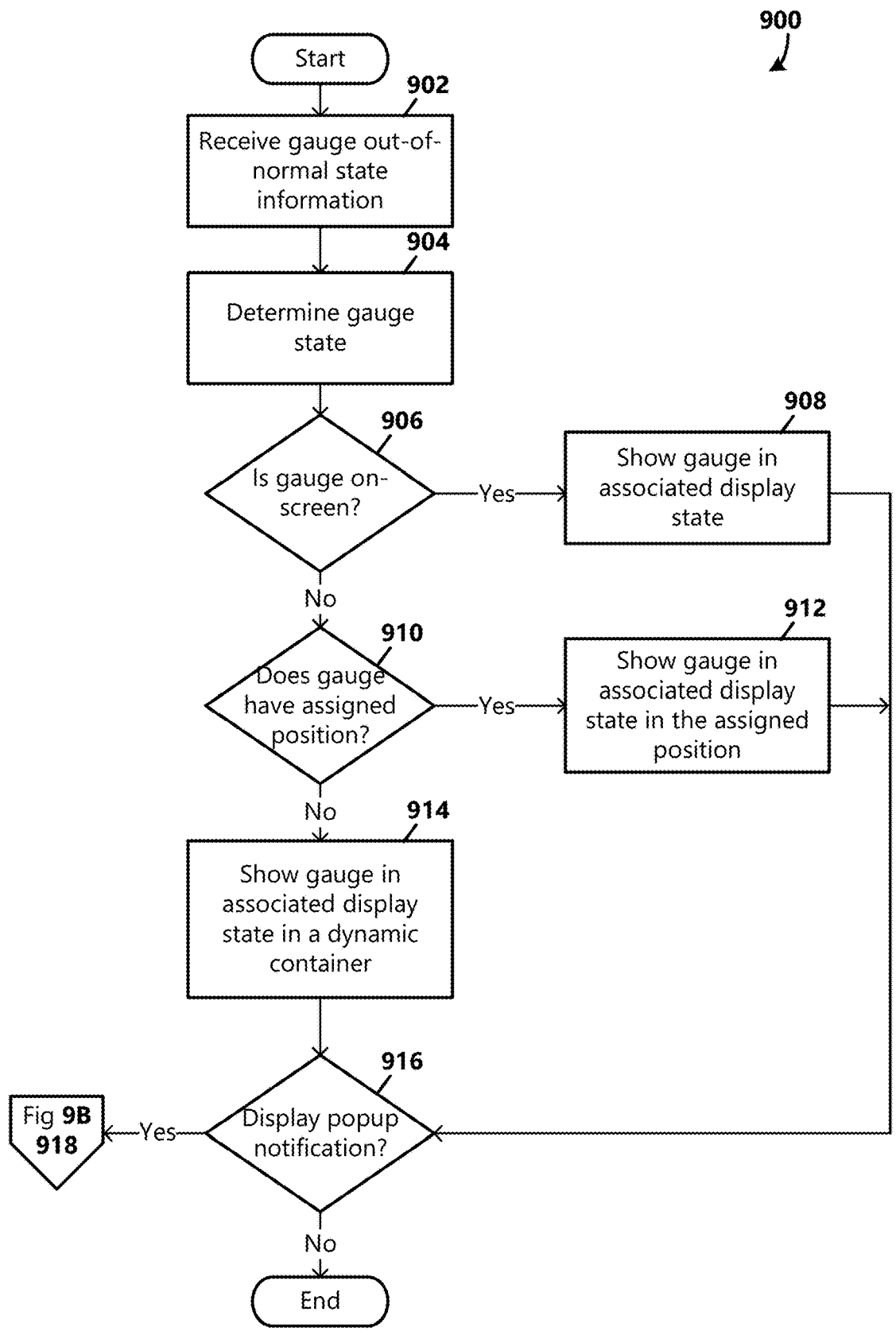
FIGS. 9A-B is a flow diagram depicting general stages of an example process for providing flexible vehicle status notifications via an instrument cluster displayed on an in-vehicle screen.
Figure 9B:
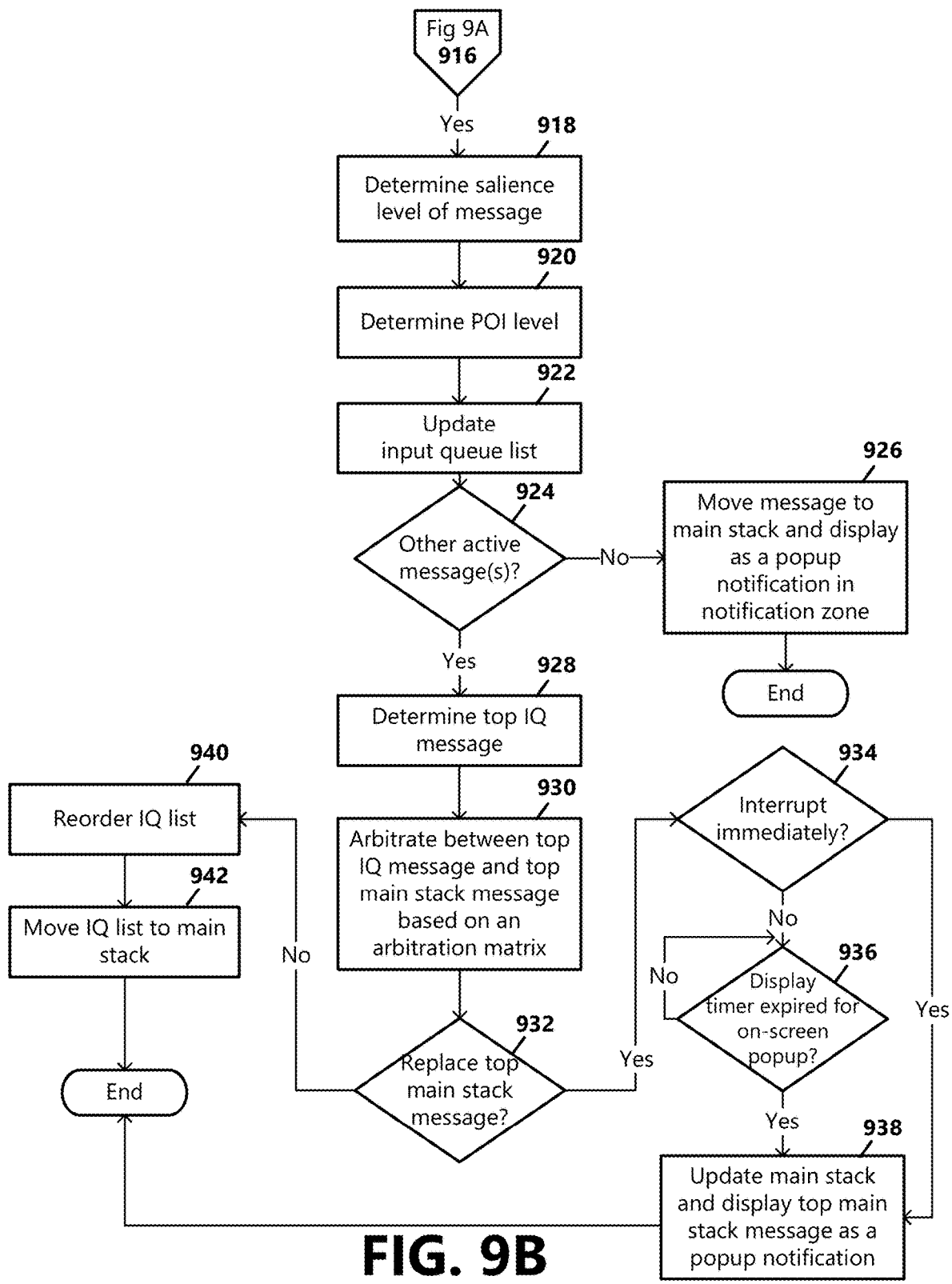

FIGS. 9A-B is a flow diagram depicting general stages of an example method 900 for providing flexible vehicle status notifications via an instrument cluster 106 displayed on an in-vehicle screen 128. At OPERATION 902, information associated with a gauge measurement that is outside a normal operating range may be received.

At OPERATION 904, a gauge state may be determined based on the gauge measurement. In some examples, the gauge may be in a warning state, wherein the gauge measurement may meet or exceed the gauge's warning threshold. In other examples, the gauge may be in an out-of-parameter state, wherein the gauge measurement may be outside of the normal operating threshold (e.g., above or below), but not within the warning threshold (e.g., approaching the warning threshold).

At DECISION OPERATION 906, a determination may be made as to whether the gauge may be currently displayed on-screen or hidden. For example, the driver may have a particular display mode selected where some gauges may be hidden from display due to space constraints or driver preference. If the gauge is currently displayed in the instrument cluster 106 display, at OPERATION 908, the displayed gauge may be dynamically transitioned to an out-of-parameter or warning display state. For example, based on the determined gauge state, certain user interface effects may be applied to the gauge to increase saliency of the gauge. For example, the certain user interface effects (e.g., color, animation, sound) may be indicative of the determined gauge state, wherein a warning state gauge may be presented with increased salience over an out-of-parameter state gauge (e.g., red versus amber color, flashing, sound effect).

If a determination is made at DECISION OPERATION 906 that the gauge is currently hidden from display, at DECISION OPERATION 910, a determination may be made as to whether or not the gauge has an assigned position (i.e., gauge container position) in a content display mode. For example, a particular content view mode may be selected where content displayed in the instrument cluster 106 is minimized, and accordingly, some gauges may be hidden from display but may have an assigned position in a less-minimized display mode. When a determination is made that the gauge has an assigned position, at OPERATION 912, the hidden gauge may be dynamically displayed in its assigned position in the out-of-parameter or warning display state.

When a determination is made at DECISION OPERATION 910 that the gauge does not have an assigned position, at OPERATION 914, the hidden gauge may be dynamically displayed in a dynamic container 218,236 in the out-of-parameter or warning display state. In some examples, when the dynamic container 218,236 is displayed, other currently-displayed gauges may be compacted to make room for the dynamic container.

At DECISION OPERATION 916, a determination may be made as to whether to display a popup notification 500 in association with the outside-of-normal operating range condition. In some examples, this determination may be made based on preconfigured rules. For example, these rules may be based on industry regulations, whether a gauge warning or telltale may be sufficient for informing the driver about the condition, and/or whether a popup notification 500 may be appropriate for informing the driver about the condition. If a determination is made to not display a popup notification 500, the method 900 may end. Else, if a determination is made to display a popup notification 500, the method 900 may continue to OPERATION 918 in FIG. 9B, where a salience level 602 (sometimes referred to as a criticality level) of the message/notification may be determined using a decision matrix, such as the example decision matrix 600 illustrated in FIG. 6. For example, a safety relevance rating, an operational relevance rating, and a time relevance rating may be determined based on an evaluation of a first set of criteria, and based on these determined ratings, a salience level 602 that corresponds with display/presentation attributes 604 of the popup notification 500 may be determined.

At OPERATION 920, a POI level (e.g., importance/priority level) of the message/notification may be determined using a second set of criteria and a decision matrix tool. For example, a safety relevance rating, an operational relevance rating, and a time relevance rating may be determined based on an evaluation of a second set of criteria, and based on these determined ratings, a POI level (e.g., one of levels 1-45) may be determined.

At OPERATION 922, a popup notification input queue (IQ) list 706 may be updated to include the message/notification, wherein messages 704 included in the IQ list 706 may be ordered according to salience level 602, POI level, and order of occurrence, and further prioritized for un-shown messages over previously-shown ones.

At DECISION OPERATION 924, a determination may be made as to whether there are other active messages (e.g., other IQ messages 704 and/or MS messages 712). If there are no other active messages, at OPERATION 926, the message/notification may be selected as the top IQ message 704a, moved to the main stack 708 and re-labeled as the top MS message 712a, and then displayed as a popup notification 500 in the notification zone 212 in the instrument cluster 106 display.

If a determination is made at DECISION OPERATION 924 that there are other active messages, at OPERATION 928, a top-ranking IQ message 704a may be determined, and at OPERATION 930, an arbitration between the top-ranking IQ message 704a and the top MS message 712a (i.e., current on-screen popup notification) may be performed using the example arbitration matrix 800. Based on an evaluation of the top MS message 712a and the top IQ message 704 using the arbitration matrix 800, a determination may be made at DECISION OPERATION 932 whether to replace the top MS message 712a with the top IQ message 704 or to hold.

When a determination is made to replace the top MS message 712a with the top IQ message 704, another determination may be made using the arbitration matrix 800 at DECISION OPERATION 934 whether to interrupt the display of the current on-screen popup notification 500 (i.e., top MS message 712a) immediately or to interrupt the display of the current on-screen popup notification 500 after a minimum display time for the current popup has passed. When a determination is made to not interrupt the display of the current on-screen popup notification 500 immediately, at OPERATION 936, a determination may be made whether the minimum display time for the current on-screen popup notification 500 has passed. When the minimum display time for the current on-screen popup notification 500 has passed or when a determination is made to interrupt the display of the current on-screen popup notification 500 with the top IQ message 704 immediately at DECISION OPERATION 934, at OPERATION 938, the main stack list 710 may be replaced by the ordered IQ list 706, wherein the top IQ message 704a may replace the top MS message 712a, and may be displayed as a popup notification 500 in the notification zone 212.

When a determination is made at DECISION OPERATION 932 to not replace the top MS message 712a with the top IQ message 704a, at OPERATION 940, the top IQ message 704a may remain in the IQ list 706, and the IQ list 706 may be re-ordered according to salience level 602, POI level, and order of occurrence (i.e., without prioritizing un-shown messages over previously-shown ones).

At OPERATION 942, the re-ordered IQ list 706 may be moved to and replace the MS list 710 (with exception of the current top MS message 712a), where the messages can be accessed by the driver.

Figure 10:
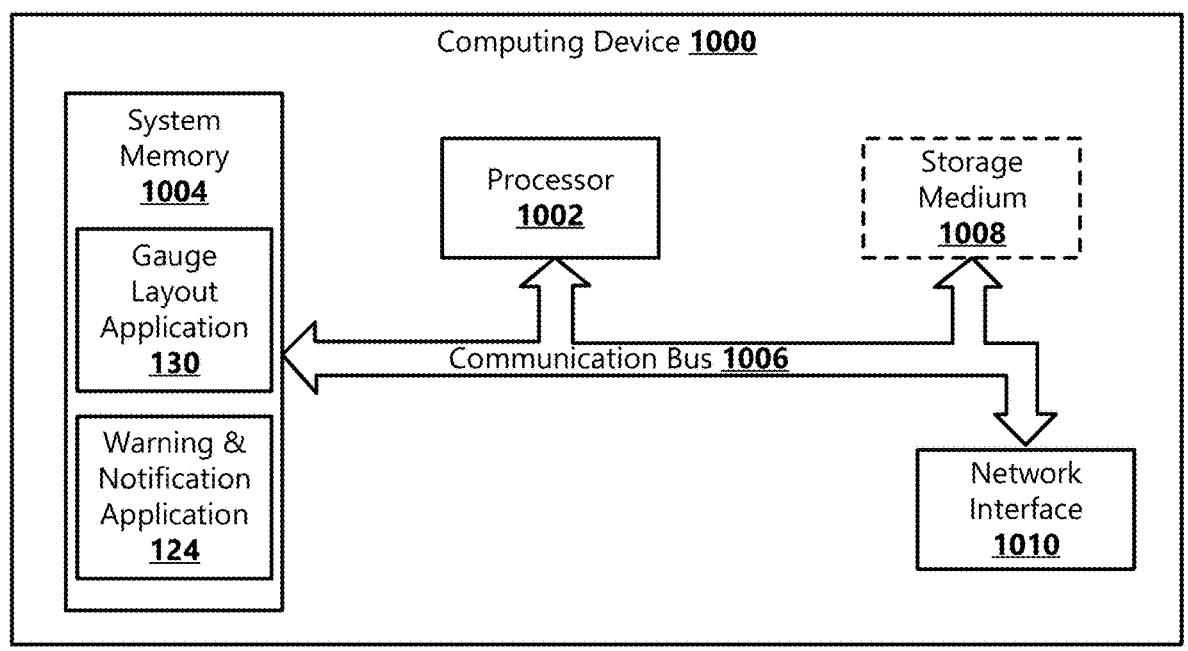
FIG. 10 is a block diagram of an example physical components of a computing device or system with which embodiments may be practiced.

FIG. 10 is a block diagram of an illustrative computing device 1000 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read-only memory ("ROM"), random access memory ("RAM"), EEPROM, flash memory, or other memory technology. Those of ordinary skill in the art and others will recognize that system memory 1004 typically stores data or program modules that are immediately accessible to or currently being operated on by the processor 1002. In some examples, system memory 1004 may store an application to perform elements of the present systems and methods, such as the gauge layout application 130 and/or the warning and notification application 124. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 10, the computing device 1000 also includes a storage medium 1008. However, services may be accessed using a computing device that does not include means for persisting data to a local storage medium. Therefore, the storage medium 1008 depicted in FIG. 10 is optional. In any event, the storage medium 1008 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 1004 and storage medium 1008 depicted in FIG. 10 are examples of computer-readable media.

For ease of illustration and because it is not important for an understanding of the claimed subject matter, FIG. 10 does not show some of the typical components of many computing devices. In this regard, the computing device 1000 may include input devices, such as a keyboard, keypad, mouse, trackball, microphone, video camera, touchpad, touchscreen, electronic pen, stylus, or the like. Such input devices may be coupled to the computing device 1000 by wired or wireless connections including RF, infrared, serial, parallel, Bluetooth, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 1000 (e.g., a client device), or can be integral components of the computing device 1000. In some embodiments, multiple input devices may be combined into a single, multifunction input device (e.g., a video camera with an integrated microphone). The computing device 1000 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1000, or can be integral components of the computing device 1000. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C #, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A method for providing flexible vehicle status notifications via an instrument cluster displayed on an in-vehicle screen, comprising:
    receiving information associated with a gauge measurement of a gauge that is outside of a normal operating range;
    determining a gauge state based on the received information;
    determining whether the gauge is currently displayed on-screen or hidden from display;
        when the gauge is currently displayed on-screen, updating the instrument cluster to change the gauge from a current display state to a display state associated with the gauge state, wherein the display state includes presentation attributes of a salience level corresponding to the gauge state;
        when the gauge is currently hidden from display, updating the instrument cluster to show the gauge in the display state associated with the gauge state, and wherein when the gauge is currently hidden from display, updating the instrument cluster to show the gauge further comprises:
  determining whether the gauge has an assigned position in the instrument cluster;
  when the gauge has an assigned position in the instrument cluster, showing the gauge in the assigned position; and
  when the gauge does not have an assigned position in the instrument cluster, showing the gauge in a dynamic container, wherein the dynamic container has an assigned position in the instrument cluster and is assignable to display any of a plurality of hidden gauges including the gauge.

2. The method of claim 1, wherein showing the gauge in the dynamic container further comprises compressing one or more other gauges in the instrument cluster to provide room for the dynamic container in its assigned position.

3. The method of claim 1, wherein:
  determining the gauge state comprises:
    determining, based on the received information, that the gauge measurement is within an out-of-parameter range, wherein the out-of-parameter range is between the normal operating range and a warning threshold; and
    determining that the gauge is in an out-of-parameter state; and
  updating the instrument cluster to change the gauge from the current display state to the display state associated with the gauge state comprises changing the gauge to an out-of-parameter display state including presentation attributes of a salience level corresponding to the out-of-parameter state.

4. The method of claim 1, wherein:
  determining the gauge state comprises:
    determining, based on the received information, that the gauge measurement meets or exceeds the warning threshold; and
    determining that the gauge is in a warning state; and
  updating the instrument cluster to change the gauge from the current display state to the display state associated with the gauge state comprises changing the gauge to a warning display state including presentation attributes of a salience level corresponding to the warning state.

5. A method for providing flexible vehicle status notifications via an instrument cluster displayed on an in-vehicle screen, comprising:
  receiving information associated with a gauge measurement that is outside of a normal operating range;
  determining a gauge state based on the received information;
  determining whether the gauge is currently displayed on-screen or hidden from display;
  when the gauge is currently displayed on-screen, updating the instrument cluster to change the gauge from a current display state to a display state associated with the gauge state, wherein the display state includes presentation attributes of a salience level corresponding to the gauge state; and
  when the gauge is currently hidden from display, updating the instrument cluster to show the gauge in the display state associated with the gauge state;
  determining, based on the received information, to provide a popup notification in association with the gauge measurement that is outside the normal operating range;
  determining a salience level of the popup notification based on safety relevance, operational relevance, and time relevance using a first set of evaluation criteria;
  storing, in an input queue, the popup notification in an ordered input queue list of active notifications, wherein the active notifications in the ordered input queue list are ordered based at least in part on the salience level; and
  moving the ordered input queue list to a main stack of the active notifications that are accessible for display as popup notifications in a notification zone in the instrument cluster.

6. The method of claim 5, further comprising:
  determining a priority order index level of the popup notification based on safety relevance, operational relevance, and time relevance using a second set of evaluation criteria;
  ordering the active notifications in the input queue list based on salience level, then priority order index level, then order of occurrence;
  prioritizing, in the ordered input queue list, the active notifications that have not been previously shown;
  selecting a top input queue notification from the ordered input queue list;
  using an arbitration matrix to arbitrate between the top input queue notification and a current top main stack notification;
  based on results of the arbitration using the arbitration matrix, determining a next popup notification to display; and
  displaying the determined next popup notification in the notification zone using presentation attributes corresponding to the popup notification's salience level.

7. The method of claim 6, wherein displaying the determined next popup notification using presentation attributes corresponding to the popup notification's salience level comprises using a combination of: color; sound effect; and flashing effect.

8. The method of claim 6, wherein determining the next popup notification to display further comprises:
  determining whether to interrupt a display of the current top main stack notification with the top input queue notification immediately or after a minimum display time of the current top main stack notification has passed.

9. A system for providing flexible vehicle status notifications via an instrument cluster displayed on an in-vehicle screen; the system comprising:
  at least one processor;
  a memory storage device including instructions that, when executed by the at least one processor, cause the system to:
    receive information associated with a gauge measurement of a gauge that is outside a normal operating range;
    determine a gauge state based on the received information;
    determine whether the gauge is currently displayed on-screen or hidden from display;
    when the gauge is currently displayed on-screen, update the instrument cluster to change the gauge from a current display state to a display state associated with the gauge state, wherein the display state includes presentation attributes of a salience level corresponding to the gauge state;

when the gauge is currently hidden from display, update the instrument cluster to show the gauge in the display state associated with the gauge state; and wherein when the gauge is currently hidden from display, in updating the instrument cluster to show the gauge, the system is configured to:

determine whether the gauge has an assigned position in the instrument cluster;

when the gauge has an assigned position in the instrument cluster, show the gauge in the assigned position; and when the gauge does not have an assigned position in the instrument cluster, show the gauge in a dynamic container, wherein the dynamic container has an assigned position in the instrument cluster and is assignable to display any of a plurality of hidden gauges including the gauge.

10. The system of claim 9, wherein in showing the gauge in the dynamic container, the system is further configured to compress one or more other gauges in the instrument cluster to provide room for the dynamic container in its assigned position.

11. The system of claim 9, wherein:

when the gauge measurement is within an out-of-parameter range between the normal operating range and a warning threshold, the system is further configured to determine that the gauge is in an out-of-parameter state; and the display state associated with the gauge state comprises an out-of-parameter display state including presentation attributes of the salience level corresponding to the out-of-parameter state.

12. The system of claim 9, wherein:

when the gauge measurement meets or exceeds the warning threshold, the system is further configured to determine that the gauge is in a warning state; and the display state associated with the gauge state comprises a warning display state including presentation attributes of the salience level corresponding to the warning state.

13. The system of claim 9, wherein the presentation attributes of the salience level corresponding to the gauge state comprise a combination of:

color;
flashing effects; and
sound effects.

14. A system for providing flexible vehicle status notifications via an instrument cluster displayed on an in-vehicle screen; the system comprising:

at least one processor;

a memory storage device including instructions that, when executed by the at least one processor, cause the system to:

receive information associated with a gauge measurement that is outside a normal operating range;

determine a gauge state based on the received information;

determine whether the gauge is currently displayed on-screen or hidden from display;

when the gauge is currently displayed on-screen, update the instrument cluster to change the gauge from a current display state to a display state associated with the gauge state, wherein the display state includes presentation attributes of a salience level corresponding to the gauge state;

when the gauge is currently hidden from display, update the instrument cluster to show the gauge in the display state associated with the gauge state;

determine, based on the received information, to provide a popup notification in association with the gauge measurement that is outside the normal operating range;

determine a salience level of the popup notification based on safety relevance, operational relevance, and time relevance using a first set of evaluation criteria;

store, in an input queue, the popup notification in an ordered input queue list of active notifications, wherein the active notifications in the ordered input queue list are ordered based at least in part on the salience level; and move the ordered input queue list to a main stack of the active notifications that are accessible for display as popup notifications in a notification zone in the instrument cluster.

15. The system of claim 14, wherein the notification zone is a reconfigurable area located central to a driver's field of vision on the instrument cluster that allows for reusing screen space for providing warning and information from a range of data sources.

16. The system of claim 14, wherein the system is further configured to:

determine a priority order index level of the popup notification based on safety relevance, operational relevance, and time relevance using a second set of evaluation criteria;

order the active notifications in the ordered input queue list based on salience level, then priority order index level, then order of occurrence;

prioritize, in the ordered input queue list, the active notifications that have not been previously shown;

select a top input queue notification from the ordered input queue list;

use an arbitration matrix to arbitrate between the top input queue notification and a current top main stack notification;

based on results of the arbitration using the arbitration matrix, determine a next popup notification to display; and display the determined next popup notification in the notification zone using presentation attributes corresponding to the popup notification's salience level.

17. A non-transitory computer readable storage device including computer readable instructions that, when executed by at least one processing unit, are configured to cause the at least one processing unit to perform a method, the method comprising:

receiving information that a gauge measurement of a gauge: is in an out-of-parameter range between a normal operating range and a warning threshold; or meets or exceeds the warning threshold;

based on the received information, determining the gauge is in an out-of-parameter state or a warning state, respectively;

determining whether the gauge is currently displayed on-screen or hidden from display;

when the gauge is currently displayed on-screen, updating the instrument cluster to convey the gauge is in an out-of-parameter state or a warning state, respectively; and when the gauge is currently hidden from display, updating the instrument cluster to show the gauge in an assigned position and in an out-of-parameter state or a warning state, respectively, wherein the assigned position is:

an assigned position for the gauge in another content view; or a dynamic container if the gauge does not have an assigned position in another content view, wherein the dynamic container has an assigned position in the instrument cluster and is assignable to display any of a plurality of hidden gauges including the gauge.

18. The non-transitory computer readable storage device of claim 17, wherein the method further comprises:

determining, based on the received information, to provide a popup notification in association with the gauge measurement that is outside the normal operating range;

determining a salience level of the popup notification based on safety relevance, operational relevance, and time relevance using a first set of evaluation criteria;

determining a priority order index level of the popup notification based on safety relevance, operational relevance, and time relevance using a second set of evaluation criteria;

storing, in an input queue, the popup notification in an ordered input queue list of active notifications, wherein the active notifications in the ordered input queue list are ordered based on salience level, then priority order index level, then order of occurrence;

prioritizing, in the ordered input queue list, the active notifications that have not been previously shown;

selecting a top input queue notification from the ordered input queue list;

using an arbitration matrix to arbitrate between the top input queue notification and a current top main stack notification;

based on results of the arbitration using the arbitration matrix, determining a next popup notification to display; and displaying the determined next popup notification in the notification zone using presentation attributes corresponding to the popup notification's salience level.

\* \* \* \* \*